(12) United States Patent
Zhang et al.

(10) Patent No.: US 11,493,731 B2
(45) Date of Patent: Nov. 8, 2022

(54) OPTICAL IMAGING LENS ASSEMBLY

(71) Applicant: Zhejiang Sunny Optical Co., Ltd, Ningbo (CN)

(72) Inventors: Kaiyuan Zhang, Ningbo (CN); Biao Xu, Ningbo (CN); Bo Song, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 210 days.

(21) Appl. No.: 16/486,073

(22) PCT Filed: Sep. 26, 2018

(86) PCT No.: PCT/CN2018/107653
§ 371 (c)(1),
(2) Date: Aug. 14, 2019

(87) PCT Pub. No.: WO2019/114366
PCT Pub. Date: Jun. 20, 2019

(65) Prior Publication Data
US 2020/0057249 A1 Feb. 20, 2020

(30) Foreign Application Priority Data
Dec. 14, 2017 (CN) .......................... 201711341246.5

(51) Int. Cl.
*G02B 9/62* (2006.01)
*G02B 27/00* (2006.01)
(Continued)

(52) U.S. Cl.
CPC ........... *G02B 9/62* (2013.01); *G02B 27/0025* (2013.01); *G02B 27/64* (2013.01); *H04N 5/2254* (2013.01); *G02B 13/0045* (2013.01)

(58) Field of Classification Search
CPC ...... G02B 27/0025; G02B 27/64; G02B 9/62; G02B 13/0045; H04N 5/2254
(Continued)

(56) References Cited

U.S. PATENT DOCUMENTS 9,488,808 B1 * 11/2016 Chen .................. G02B 13/0045
2013/0235473 A1 * 9/2013 Chen .................. G02B 13/0045
359/713

(Continued)

FOREIGN PATENT DOCUMENTS

CN 103576296 A 2/2014
CN 104330876 A 2/2015
(Continued)

OTHER PUBLICATIONS https://www.desmos.com/calculator, Graph and function for determining aspheric lens shape (Year: 2021).*

(Continued)

*Primary Examiner* — Travis S Fissel
(74) *Attorney, Agent, or Firm* — Barnes & Thornburg LLP

(57) ABSTRACT

An optical imaging lens assembly from an object side to an image side along an optical axis sequentially includes: a first lens, having a positive refractive power, its object-side surface is convex and its image-side surface is concave; a second lens, having a refractive power, its object-side surface is convex and its image-side surface is concave; a third lens, having a refractive power; a fourth lens, having a refractive power and its object-side surface is concave; a fifth lens, having a positive refractive power, its object-side surface is concave and its image-side surface is convex; and a sixth lens, having a negative refractive power and its object-side surface is concave. A total effective focal length f of the optical imaging lens assembly and a radius of (Continued)

curvature R12 of an image-side surface of the sixth lens satisfy: $0 \leq f/R12 \leq 1.5$.

19 Claims, 12 Drawing Sheets

(51) Int. Cl.
  *G02B 27/64* (2006.01)
  *H04N 5/225* (2006.01)
  *G02B 13/00* (2006.01)
(58) Field of Classification Search
  USPC .............. 359/658, 708, 713, 752, 756–757
  See application file for complete search history.

(56) References Cited

U.S. PATENT DOCUMENTS

| | | | |
|---|---|---|---|
| 2013/0329306 A1* | 12/2013 | Tsai | .................. G02B 13/18 359/713 |
| 2015/0370038 A1* | 12/2015 | Sun | .................. G02B 13/005 359/757 |
| 2016/0091695 A1* | 3/2016 | Chen | .................. G02B 9/62 359/713 |
| 2017/0153421 A1* | 6/2017 | Baik | .................. G02B 5/005 |
| 2017/0219803 A1* | 8/2017 | Lee | .................. G02B 5/208 |
| 2019/0121064 A1 | 4/2019 | Zhang et al. | |

FOREIGN PATENT DOCUMENTS

| | | |
|---|---|---|
| CN | 107272161 A | 10/2017 |
| CN | 107329234 A | 11/2017 |
| CN | 107450157 A | 12/2017 |
| CN | 107843977 A | 3/2018 |

OTHER PUBLICATIONS

International Search Report for International Application No. PCT/CN2018/107653, dated Jan. 4, 2019, 6 pages.

\* cited by examiner

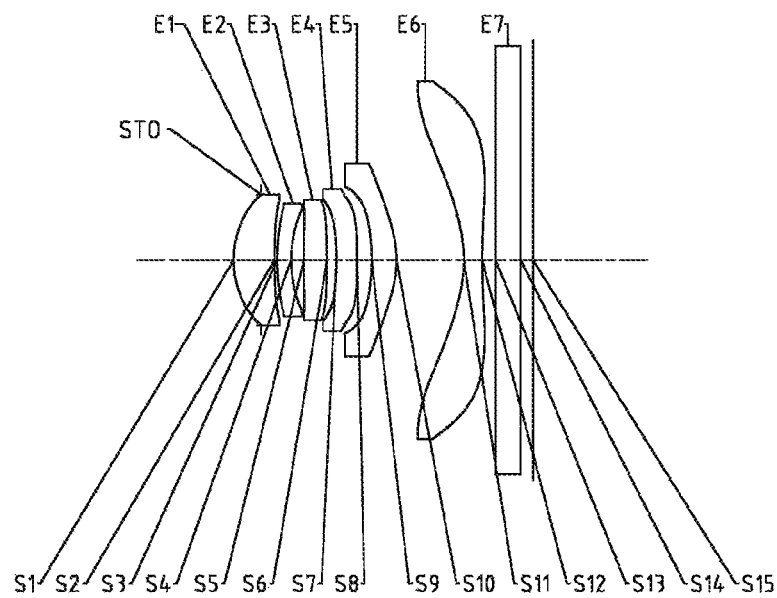
Fig. 1
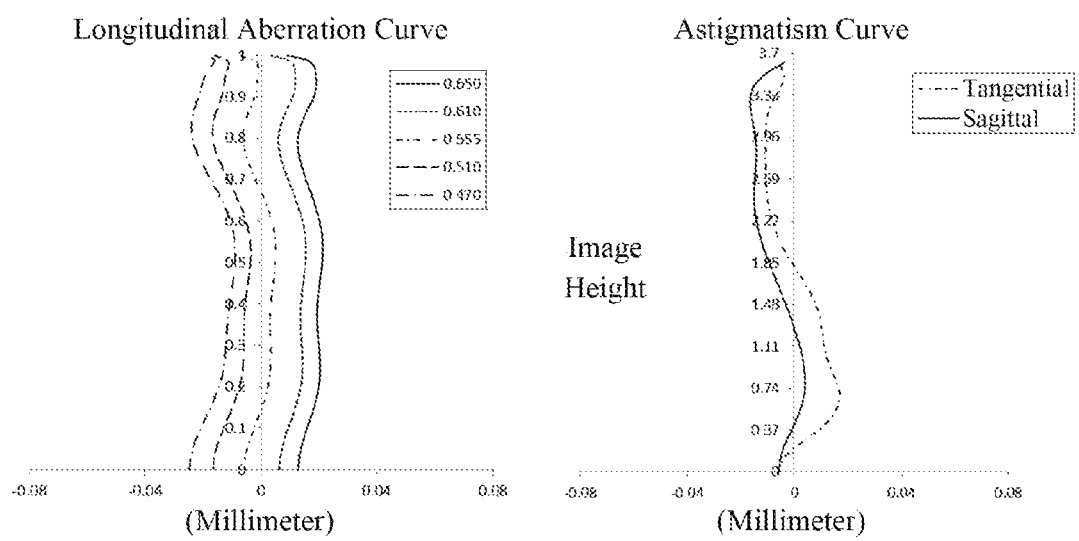
Fig. 2A
Fig. 2B

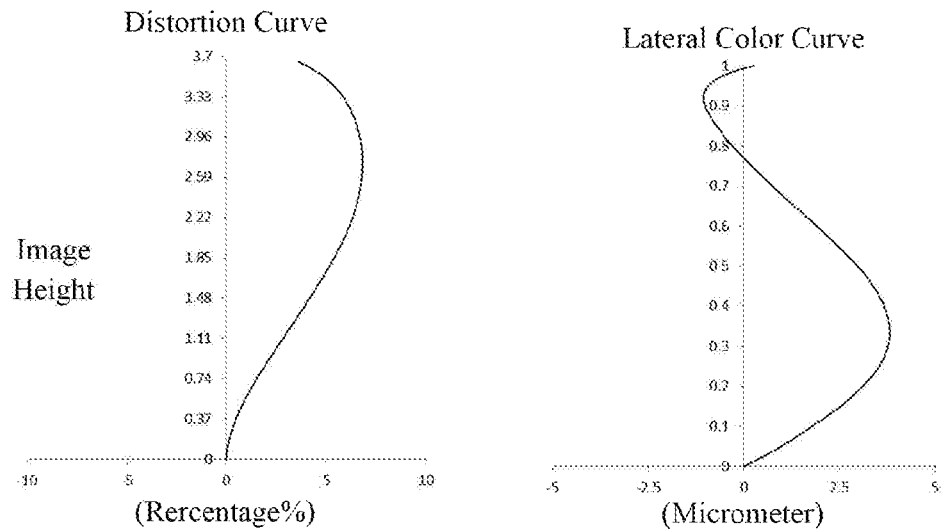
Fig. 6C
Fig. 6D
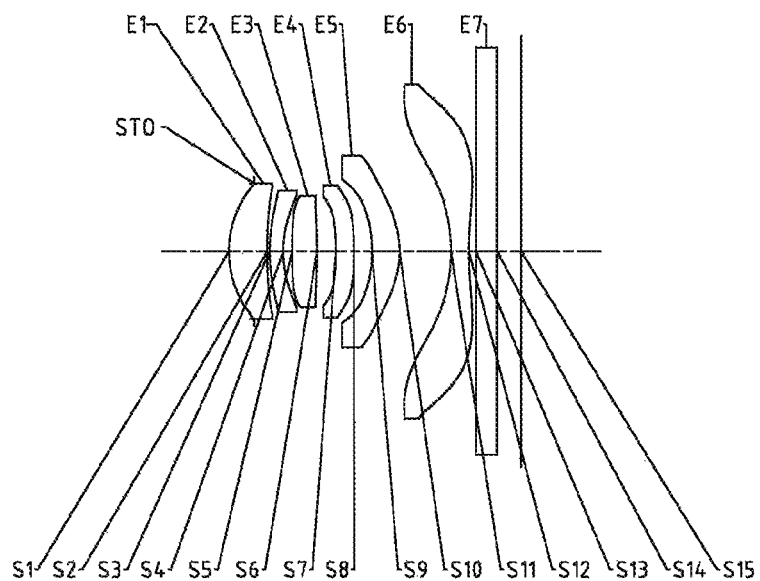
Fig. 7

OPTICAL IMAGING LENS ASSEMBLY

CROSS-REFERENCE TO RELATED APPLICATION

This application is a U.S. nationalization under 35 U.S.C. § 371 of International Application No. PCT/CN2018/107653, filed Sep. 26, 2018, which claims the priority to Chinese Patent Application No. 201711341246.5, filed on Dec. 14, 2017. All of the aforementioned applications are hereby incorporated by reference in their entireties.

TECHNICAL FIELD

The present disclosure relates to an optical imaging lens assembly, and specifically to an optical imaging lens assembly including six lenses.

BACKGROUND

In recent years, there has been an increasing demand for imaging lens assembly which is suitable for portable electronic products. The portable electronic products tend to be miniaturized, which limits the overall length of the lens assembly, and thereby increases the difficulty of designing the lens assembly.

Meanwhile, with the improvement of performance and the reduction of size of the commonly used photosensitive elements such as a photosensitive Charge-Coupled Device (CCD) or a Complementary Metal-Oxide Semiconductor (CMOS), the number of pixels of the photosensitive element is increased and the sizes of pixels of the photosensitive element are decreased, which leads to higher requirements for high image quality and miniaturization of the matching imaging lens assembly.

SUMMARY

The present disclosure provides an optical imaging lens assembly that is applicable to portable electronic products and at least solves or partially addresses at least one of the above disadvantages of the prior art.

In one aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, an object-side surface thereof may be a convex surface and an image-side surface thereof may be a concave surface; the second lens has a positive refractive power or a negative refractive power, an object-side surface thereof may be a convex surface and an image-side surface thereof may be a concave surface; the third lens has a positive refractive power or a negative refractive power; the fourth lens has a positive refractive power or a negative refractive power, and an object-side surface thereof may be a concave surface; the fifth lens may have a positive refractive power, an object-side surface thereof may be a concave surface and an image-side surface thereof may be a convex surface; and the sixth lens may have a negative refractive power, and an object-side surface thereof may be a concave surface. A total effective focal length f of the optical imaging lens assembly and a radius of curvature R12 of an image-side surface of the sixth lens may satisfy: $0 \leq f/R12 \leq 1.5$.

In an implementation, an effective focal length f5 of the fifth lens and an effective focal length f6 of the sixth lens may satisfy: $-5.0 < f5/f6 < -1.0$.

In an implementation, an effective focal length f1 of the first lens and a radius of curvature R1 of the object-side surface of the first lens may satisfy: $2.0 \leq f1/R1 < 2.5$.

In an implementation, an effective focal length f5 of the fifth lens and a radius of curvature R10 of the image-side surface of the fifth lens may satisfy: $2.0 < |f5/R10| < 9.0$.

In an implementation, a total effective focal length f of the optical imaging lens assembly, an effective focal length f5 of the fifth lens and an effective focal length f6 of the sixth length may satisfy: $1.0 < |f/f5| + |f/f6| < 2.5$.

In an implementation, an effective focal length f6 of the sixth lens and a center thickness CT6 on the optical axis of the sixth lens may satisfy: $8 < |f6/CT6| < 20$.

In an implementation, a distance TTL on the optical axis from a center of the object-side surface of the first lens to the image plane of the optical imaging lens assembly and half of a diagonal length ImgH of an effective pixel area on the image plane of the optical imaging lens assembly may satisfy: $TTL/ImgH \leq 1.5$.

In an implementation, a radius of curvature R3 of the object-side surface of the second lens and a radius of curvature R4 of the image-side surface of the second lens may satisfy: $2.5 \leq (R3+R4)/(R3-R4) < 6.0$.

In an implementation, a center thickness CT1 on the optical axis of the first lens and a center thickness CT6 on the optical axis of the sixth lens may satisfy: $1.0 < CT1/CT6 < 4.0$.

In an implementation, a radius of curvature R11 of the object-side surface of the sixth lens and a radius of curvature R12 of an image-side surface of the sixth lens may satisfy: $-3.0 < R11/R12 < 0$.

In an implementation, a distance TTL on the optical axis from a center of the object-side surface of the first lens to an image plane of the optical imaging lens assembly and a sum of spaced distances $\Sigma AT$ on the optical axis between any two adjacent lenses of the first lens to the sixth lens may satisfy: $2.0 < TTL/\Sigma AT \leq 3.0$.

In an implementation, a total effective focal length f of the optical imaging lens assembly and a radius of curvature R12 of an image-side surface of the sixth lens may satisfy: $0 \leq f/R12 \leq 1.5$.

In an implementation, a spaced distance T56 on the optical axis between the fifth lens and the sixth lens, a spaced distance T12 on the optical axis between the first lens and the second lens, a spaced distance T23 on the optical axis between the second lens and the third lens, and a spaced distance T34 on the optical axis between the third lens and the fourth lens may satisfy: $1.5 \leq T56/(T12+T23+T34) \leq 3.0$.

In an implementation, a spaced distance T56 on the optical axis between the fifth lens and the sixth lens and a spaced distance T23 on the optical axis between the second lens and the third lens may satisfy: $3.5 < T56/T23 < 10.0$.

In another aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, an object-side surface thereof may be a convex surface and an image-side surface thereof may be a concave surface; the second lens has a positive refractive power or a negative refractive power, an object-side surface thereof may be a convex surface, and an image-side surface thereof may be a concave surface; the third lens has a positive refractive power or a negative refractive power; the fourth lens has a positive refractive power or a negative refractive power, and an object-side surface thereof may be a concave surface; the fifth lens may have a positive refractive power, an object-side surface thereof may be a concave surface, and an image-side surface thereof may be a convex surface; and the sixth lens may have a negative refractive power, and an object-side surface thereof may be a concave surface. A spaced distance T56 on the optical axis between the fifth lens and the sixth lens, a spaced distance T12 on the optical axis between the first lens and the second lens, a spaced distance T23 on the optical axis between the second lens and the third lens, and a spaced distance T34 on the optical axis between the third lens and the fourth lens may satisfy: $1.5 \leq T56/(T12+T23+T34) \leq 3.0$.

In another aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, an object-side surface thereof may be a convex surface and an image-side surface thereof may be a concave surface; the second lens has a positive refractive power or a negative refractive power, an object-side surface thereof may be a convex surface, and an image-side surface thereof may be a concave surface; the third lens has a positive refractive power or a negative refractive power; the fourth lens has a positive refractive power or a negative refractive power, and an object-side surface thereof may be a concave surface; the fifth lens may have a positive refractive power, an object-side surface thereof may be a concave surface, and an image-side surface thereof may be a convex surface; and the sixth lens may have a negative refractive power, and an object-side surface thereof may be a concave surface. A spaced distance T56 on the optical axis between the fifth lens and the sixth lens and a spaced distance T23 on the optical axis between the second lens and the third lens may satisfy: $4.5 < T56/T23 < 10.0$.

In another aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, an object-side surface thereof may be a convex surface and an image-side surface thereof may be a concave surface; the second lens has a positive refractive power or a negative refractive power, an object-side surface thereof may be a convex surface, and an image-side surface thereof may be a concave surface; the third lens has a positive refractive power or a negative refractive power; the fourth lens has a positive refractive power or a negative refractive power, and an object-side surface thereof may be a concave surface; the fifth lens may have a positive refractive power, an object-side surface thereof may be a concave surface, and an image-side surface thereof may be a convex surface; and the sixth lens may have a negative refractive power, and an object-side surface thereof may be a concave surface. A total effective focal length f of the optical imaging lens assembly, an effective focal length f5 of the fifth lens and an effective focal length f6 of the sixth length may satisfy: $1.0 < |f/f5| + |f/f6| < 2.5$.

In another aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, an object-side surface thereof may be a convex surface and an image-side surface thereof may be a concave surface; the second lens has a positive refractive power or a negative refractive power, an object-side surface thereof may be a convex surface, and an image-side surface thereof may be a concave surface; the third lens has a positive refractive power or a negative refractive power; the fourth lens has a positive refractive power or a negative refractive power, and an object-side surface thereof may be a concave surface; the fifth lens may have a positive refractive power, an object-side surface thereof may be a concave surface, and an image-side surface thereof may be a convex surface; and the sixth lens may have a negative refractive power, and an object-side surface thereof may be a concave surface. An effective focal length f6 of the sixth lens and a center thickness CT6 on the optical axis of the sixth lens may satisfy: $8 < |f6/CT6| < 20$.

The present disclosure employs a plurality of (for example, six) lenses, and the optical imaging lens assembly has at least one advantageous effect such as ultra-thin, miniaturization, high image quality, low sensitivity, and the like by rationally distributing the refractive power, the surface shape, the center thickness of each lens, and the spaced distance on the optical axis between the lenses and the like.

BRIEF DESCRIPTION OF THE DRAWINGS

Other features, purpose and advantages of the present disclosure will become apparent through the detailed description of the non-limiting implementations given in conjunction with the accompanying drawings. In the drawings:

FIG. 1 illustrates a schematic structural view of an optical imaging lens assembly according to embodiment 1 of the present disclosure;

FIGS. 2A to 2D illustrate a longitudinal aberration curve, an astigmatic curve, a distortion curve and a lateral color curve of the optical imaging lens assembly of the embodiment 1, respectively;

FIGS. 6A to 6D illustrate a longitudinal aberration curve, an astigmatic curve, a distortion curve and a lateral color curve of the optical imaging lens assembly of the embodiment 3, respectively;

FIG. 7 illustrates a schematic structural view of an optical imaging lens assembly according to embodiment 4 of the present disclosure;

DETAILED DESCRIPTION OF EMBODIMENTS

Figure 2C:
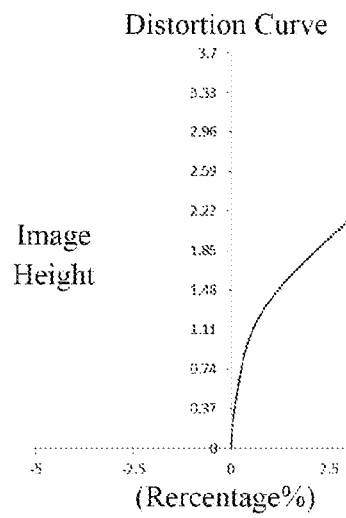

For a better understanding of the present disclosure, various aspects of the present disclosure will be described in more detail with reference to the drawings. It should be understood that, these detailed descriptions are merely used for describing exemplary embodiments of the present disclosure, but not intend to limit the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without limiting the feature. Thus, a first lens discussed below could be referred to as a second lens or a third lens without departing from the teachings of the present disclosure.

In the accompanying drawings, for convenience of explanation, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, and not strictly drawn to scale.

As used herein, a paraxial region refers to a region near the optical axis. If a surface of a lens is a convex surface and the position of the convex surface is not defined, it indicates that the surface of the lens is a convex surface at least in the paraxial region; if a surface of a lens is a concave surface and the position of the concave surface is not defined, it indicates that the surface of the lens is a concave surface at least in the paraxial region. The surface of each lens closest to the object is referred to as an object-side surface, and the surface of each lens closest to the image plane is referred to as an image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure may include, for example, six lenses having a refractive power, i.e., a first lens, a second lens, a third lens, a fourth lens, a fifth lens and a sixth lens. These six lenses are sequentially arranged from an object side to an image side along an optical axis.

In an exemplary implementation, the first lens may have a positive refractive power, an object-side surface thereof may be a convex surface and an image-side surface thereof may be a concave surface. The second lens has a positive refractive power or a negative refractive power, an object-side surface thereof may be a convex surface and an image-side surface thereof may be a concave surface. The third lens has a positive refractive power or a negative refractive power. The fourth lens has a positive refractive power or a negative refractive power, and an object-side surface thereof may be a concave surface. The fifth lens may have a positive refractive power, an object-side surface thereof may be a concave surface and an image-side surface thereof may be a convex surface. The sixth lens may have a negative refractive power, and an object-side surface thereof may be a concave surface. Through appropriate distribution of the refractive power, and appropriate selection of materials, it is advantageous to achieve large image plane and ultra-thin effects.

In an exemplary implementation, the second lens may have a negative refractive power.

In an exemplary implementation, the third lens may have a positive refractive power, and the object-side surface thereof may be a convex surface.

In an exemplary implementation, the image-side surface of the fourth lens may be a convex surface.

In an exemplary implementation, the image-side surface of the sixth lens may be a concave surface.

In an exemplary implementation, the optical imaging lens assembly according to the present disclosure may satisfy: $3.5<T56/T23<10.0$, wherein T56 is a spaced distance on the optical axis between the fifth lens and the sixth lens, and T23 is a spaced distance on the optical axis between the second lens and the third lens. More specifically, T56 and T23 may further satisfy: $3.53 \leq T56/T23 < 9.00$, for example, $4.50 \leq T56/T23 \leq 8.36$. The miniaturization of the lens assembly may be advantageously achieved by an appropriate configuration of the ratio of T56 to T23.

In an exemplary implementation, the optical imaging lens assembly according to the present disclosure may satisfy: $TTL/ImgH \leq 1.5$, wherein TTL is a distance on the optical axis from a center of the object-side surface of the first lens to the image plane of the optical imaging lens assembly, and ImgH is half of a diagonal length of an effective pixel area on the image plane of the optical imaging lens assembly. More specifically, TTL and ImgH may further satisfy: $1.34 \leq TTL/ImgH \leq 1.39$. The longitudinal dimension of the imaging system may be effectively compressed by controlling the ratio of TTL to ImgH, which in turn ensures a compact characteristic of the lens assembly.

In an exemplary implementation, the optical imaging lens assembly according to the present disclosure may satisfy: $-5.0 < f5/f6 < -1.0$, wherein f5 is an effective focal length of the fifth lens, and f6 is an effective length of the sixth lens. More specifically, f5 and f6 may further satisfy: $-4.31 \leq f5/f6 \leq -1.43$. The field curvature contribution of the fifth lens and the sixth lens may be properly controlled by controlling the ratio of f5 to f6, which in turn controls the field curvature of the imaging system at an appropriate level.

In an exemplary implementation, the optical imaging lens assembly according to the present disclosure may satisfy: $2.0 \leq f1/R1 < 2.5$, wherein f1 is an effective focal length of the first lens, and R1 is a radius of curvature of the object-side surface of the first lens. More specifically, f1 and R1 may further satisfy: $2.0 \leq f1/R1 < 2.35$, for example, $2.06 \leq f1/R1 \leq 2.29$. The contribution of the third-order spherical aberration of the first lens can be properly controlled by properly controlling the radius of curvature of the object-side surface of the first lens, which in turn balances the aberration on the optical axis of field of view of the imaging system.

In an exemplary implementation, the optical imaging lens assembly according to the present disclosure may satisfy: $2.5 \leq (R3+R4)/(R3-R4) < 6.0$, wherein R3 is a radius of curvature of the object-side surface of second lens, and R4 is a radius of curvature of the image-side surface of the second lens. More specifically, R3 and R4 may further satisfy: $2.80 \leq (R3+R4)/(R3-R4) < 5.2$, for example, $3.00 \leq (R3+R4)/(R3-R4) \leq 5.14$. The coma contribution of the second lens may be effectively controlled by properly controlling the ratio of R3 to R4, and thereby the imaging quality of the imaging system may be improved.

In an exemplary implementation, the optical imaging lens assembly according to the present disclosure may satisfy: $1.0 < CT1/CT6 < 4.0$, wherein CT1 is a center thickness on the optical axis of the first lens, and CT6 is a center thickness on the optical axis of the sixth lens. More Specifically, CT1 and CT6 may further satisfy: $1.15 \leq CT1/CT6 \leq 3.55$. By properly controlling the ratio of CT1 to CT6, the ratio of the distortion contribution of the first lens and the distortion contribution of the sixth lens may be controlled within a certain appropriate range, wherein the first lens has a positive refractive power and the sixth lens has a negative refractive power.

In an exemplary implementation, the optical imaging lens assembly according to the present disclosure may satisfy: $2.0 < |f5/R10| < 9.0$, wherein f5 is an effective focal length of the fifth lens, and R10 is a radius of curvature of the image-side surface of the fifth lens. More Specifically, f5 and R10 may further satisfy: $2.5 < |f5/R10| < 8.5$, for example, $2.91 \leq |f5/R10| \leq 8.40$. The contribution of astigmatism of the fifth lens may be advantageously controlled to an appropriate level by properly controlling the ratio of f5 to R10.

In an exemplary implementation, the optical imaging lens assembly according to the present disclosure may satisfy: $1.0 < |f/f5|+|f/f6| < 2.5$, wherein f is a total effective focal length of the optical imaging lens assembly, f5 is an effective focal length of the fifth lens and f6 is an effective focal length of the sixth lens. More Specifically, f, f5 and f6 may further satisfy: $1.2 < |f/f5|+|f/f6| < 2.2$, for example, $1.28 \leq |f/f5|+|f/f6| \leq 2.16$. By properly controlling of the ratio among f, f5 and f6, the respective contribution of the refractive powers of the fifth lens and the sixth lens may be properly controlled, and the deflection angle of the light at the last two lenses can be properly controlled, which in turns advantageously controls the sensitive of the last two lenses.

In an exemplary implementation, the optical imaging lens assembly according to the present disclosure may satisfy: $-3.0 < R11/R12 < 0$, wherein R11 is a radius of curvature of the object-side surface of the sixth lens, and R12 is a radius of curvature of an image-side surface of the sixth lens. More Specifically, R11 and R12 may further satisfy: $-2.1 < R11/R12 < -0.2$, for example, $-2.03 \leq R11/R12 \leq -0.24$. The coma direction and coma contribution of the sixth lens in different field of view may be advantageously controlled by properly controlling the ratio of R11 to R12, which in turn properly and advantageously controls the aberration of the field of view off the optical axis and the aberration related to the aperture at an appropriate level.

In an exemplary implementation, the optical imaging lens assembly according to the present disclosure may satisfy: $2.0 < TTL/\Sigma AT \leq 3.0$, wherein TTL is a distance on the optical axis from a center of the object-side surface of the first lens to the image plane, and $\Sigma AT$ is a sum of spaced distances on the optical axis between any two adjacent lenses of the lenses having refractive power. More specifically, TTL and $\Sigma AT$ may further satisfy: $2.4 < TTL/\Sigma AT \leq 3.0$, for example, $2.45 \leq TTL/\Sigma AT \leq 2.96$. By properly controlling the ratio of TTL to $\Sigma AT$, a center distance of each lens may be properly controlled, and thereby facilitating good workability of each lens.

It should be noted that, in the optical imaging lens assembly having six lenses, $\Sigma AT$ is a sum of spaced distances on the optical axis between any two adjacent lenses of the first lens to the sixth lens, i.e., $\Sigma AT=T12+T23+T34+T45+T56$ in the imaging system having six lenses, wherein T12 is a spaced distance on the optical axis between the first lens and the second lens, T23 is a spaced distance on the optical axis between the second lens and the third lens, T34 is a spaced distance on the optical axis between the third lens and the fourth lens, T45 is a spaced distance on the optical axis between the fourth lens and the fifth lens, and T56 is a spaced distance on the optical axis between the fifth lens and the sixth lens.

In an exemplary implementation, the optical imaging lens assembly according to the present disclosure may satisfy: $8 < |f6/CT6| < 20$, wherein f6 is an effective focal length of the sixth lens, and CT6 is a center thickness on the optical axis of the sixth lens. More specifically, f6 and CT6 may further satisfy: $8.58 \leq |f6/CT6| \leq 18.60$. By properly controlling the ratio of f6 to CT6, the distortion distribution and contribution of the sixth lens may be controlled, which in turn advantageously controls the total distortion of the imaging system at an appropriate level.

In an exemplary implementation, the optical imaging lens assembly according to the present disclosure may satisfy: $0 \leq f/R12 \leq 1.5$, wherein f is a total effective focal length of the optical imaging lens assembly, and R12 is a radius of curvature of the image-side surface of the sixth lens. More specifically, f and R12 may further satisfy: $0.35 \leq f/R12 \leq 1.35$, for example, $0.45 \leq f/R12 \leq 1.28$. The astigmatic contribution of the sixth lens may be properly controlled by properly controlling the ratio of f to R12, which ensures the off-axis field of view having an excellent imaging quality on the tangential plane and the sagittal plane.

In an exemplary implementation, the optical imaging lens assembly according to the present disclosure may satisfy:

$1.5 \leq T56/(T12+T23+T34) \leq 3.0$, wherein T56 is a spaced distance on the optical axis between the fifth lens and the sixth lens, T12 is a spaced distance on the optical axis between the first lens and the second lens, T23 is a spaced distance on the optical axis between the second lens and the third lens, and T34 is a spaced distance on the optical axis between the third lens and the fourth lens. More specifically, T56, T12, T23 and T34 may further satisfy: $1.71 \leq T56/(T12+T23+T34) \leq 2.76$. By properly adjusting the ratio of the air gap between the fifth lens and the sixth lens to the sum of the air gaps among the previous three lenses, the distortion of the edge field of view may be effectively controlled, so as to control the edge field distortion of the lens assembly within an appropriate range.

In an exemplary implementation, the optical imaging lens assembly described above may further include at least one diaphragm to enhance the imaging quality of the lens assembly. The diaphragm may be disposed at any position as needed, for example, the diaphragm may be disposed between the object side and the first lens, or the diaphragm may also be disposed between the second lens and the third lens.

Alternatively, the above optical imaging lens assembly may further include an optical filter for correcting the color deviation and/or a protective glass for protecting the photosensitive element on the image plane.

The optical imaging lens assembly according to the above implementations of the present disclosure may employ a plurality of lenses, such as six lenses as described above. By properly distributing the refractive power of each lens, the surface shape, the center thickness of each lens, and spaced distances on the optical axis between the lenses, the volume and the sensitivity of the imaging lens assembly can be effectively reduced, and the workability of the imaging lens assembly can be improved, such that the optical imaging lens assembly is more advantageous for production processing and may be applied to portable electronic products. At the same time, the optical imaging lens assembly configured as described above also has advantageous effects such as high imaging quality, low sensitivity, and the like.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging can be eliminated as much as possible, and thus improving the image quality.

However, it will be understood by those skilled in the art that the number of lenses constituting the optical imaging lens assembly may be varied to achieve the various results and advantages described in this specification without departing from the technical solution claimed by the present disclosure. For example, although the implementation is described by taking six lenses as an example, the optical imaging lens assembly is not limited to include six lenses. The optical imaging lens assembly may also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 shows a schematic structural view of the optical imaging lens assembly according to embodiment 1 of the present disclosure.

As shown in FIG. 1, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the image plane S15.

Table 1 shows surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4502 | | | |
| S1 | aspheric | 1.6027 | 0.6748 | 1.55 | 56.1 | 0.4623 |
| S2 | aspheric | 9.7607 | 0.0400 | | | 53.6006 |
| S3 | aspheric | 3.1360 | 0.2300 | 1.67 | 20.4 | 1.3280 |
| S4 | aspheric | 1.9074 | 0.2129 | | | 2.3977 |
| S5 | aspheric | 20.3073 | 0.3798 | 1.55 | 56.1 | 0.0000 |
| S6 | aspheric | −13.6423 | 0.1547 | | | 26.9167 |

TABLE 1-continued

| Surface number | Surface type | Radius of curvature | Thickness | Material Refractive index | Abbe number | Conic coefficient |
|---|---|---|---|---|---|---|
| S7 | aspheric | −7.5170 | 0.3396 | 1.67 | 20.4 | 48.0022 |
| S8 | aspheric | −58.6254 | 0.2406 | | | −86.1712 |
| S9 | aspheric | −3.2793 | 0.4118 | 1.65 | 23.5 | 6.0007 |
| S10 | aspheric | −1.6948 | 1.1072 | | | −1.5502 |
| S11 | aspheric | −2.2787 | 0.3000 | 1.54 | 55.7 | −7.1865 |
| S12 | aspheric | 9.5395 | 0.2226 | | | 7.3088 |
| S13 | spherical | infinite | 0.4121 | 1.52 | 64.2 | |
| S14 | spherical | infinite | 0.2039 | | | |
| S15 | spherical | infinite | | | | |

As can be seen from Table 1, the object-side surface and the image-side surface of any one of the first lens E1 to the sixth lens E6 are aspheric. In this embodiment, the surface shape x of each aspheric lens can be defined by using, but not limited to, the following aspheric formula:

$$x = \frac{ch^2}{1 + \sqrt{1 - (k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, c=1/R (that is, the paraxial curvature c is reciprocal of the radius of curvature in the above Table 1); k is the conic coefficient (given in the above Table 1); Ai is a correction coefficient for the i-th order of the aspheric surface. Table 2 below shows high-order coefficients $A_4$, $A_6$, $A_8$, $A_{10}$, $A_{12}$, $A_{16}$, $A_{18}$ and $A_{20}$ applicable to each aspheric surface S1-S12 in embodiment 1.

Table 3 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 1.

TABLE 3

| f1 (mm) | 3.41 | f6 (mm) | −3.40 |
|---|---|---|---|
| f2 (mm) | −7.89 | f (mm) | 4.30 |
| f3 (mm) | 15.01 | TTL (mm) | 4.93 |
| f4 (mm) | −12.96 | ImgH (mm) | 3.62 |
| f5 (mm) | 4.94 | | |

The optical imaging lens assembly in embodiment 1 satisfy:

T56/T23=5.20, where T56 is the spaced distance on the optical axis between the fifth lens E5 and the sixth lens E6, and T23 is the spaced distance on the optical axis between the second lens E2 and the third lens E3;

TABLE 2

| Surface number | A4 | A6 | A8 | A10 | A12 |
|---|---|---|---|---|---|
| S1 | −2.0654E−02 | 9.9813E−02 | −4.6267E−01 | 1.3165E+00 | −2.4168E+00 |
| S2 | −8.1455E−02 | 4.5637E−01 | −1.3535E+00 | 3.2167E+00 | −5.9473E+00 |
| S3 | −1.6639E−01 | 5.0861E−01 | −1.1825E+00 | 2.2800E+00 | −3.8242E+00 |
| S4 | −1.4579E−01 | 1.5925E−01 | −1.4604E−01 | −3.0112E−01 | 7.1166E−01 |
| S5 | 9.3836E−03 | −1.8393E−01 | 8.0243E−01 | −2.0900E+00 | 2.9321E+00 |
| S6 | −2.3849E−02 | −2.8819E−02 | 1.0116E−01 | −1.6003E−01 | 3.2623E−02 |
| S7 | −1.3890E−01 | −2.0358E−03 | 1.0722E−01 | −1.4494E−01 | 1.8239E−01 |
| S8 | −1.1690E−01 | −4.1245E−02 | −9.7302E−03 | 1.7842E−02 | −1.9741E−03 |
| S9 | 8.7183E−02 | −2.4667E−01 | 8.5391E−01 | −2.2470E+00 | 3.4946E+00 |
| S10 | 8.2217E−02 | −1.6366E−01 | 4.7124E−01 | −7.5286E−01 | 6.8146E−01 |
| S11 | −9.0140E−03 | 1.3641E−03 | 4.3495E−05 | −3.4864E−06 | −5.4808E−07 |
| S12 | −2.1625E−02 | 2.0854E−03 | −2.4296E−04 | −8.8597E−06 | 9.6611E−07 |

| Surface number | A14 | A16 | A18 | A20 |
|---|---|---|---|---|
| S1 | 2.8586E+00 | −2.0980E+00 | 8.6876E−01 | −1.5472E−01 |
| S2 | 8.0665E+00 | −7.3275E+00 | 3.9132E+00 | −9.2602E−01 |
| S3 | 5.4921E+00 | −5.8224E+00 | 3.7176E+00 | −1.0493E+00 |
| S4 | 2.7449E−01 | −2.4301E+00 | 2.8553E+00 | −1.1258E+00 |
| S5 | −2.2114E+00 | 7.2507E−01 | 0.0000E+00 | 0.0000E+00 |
| S6 | −2.0248E−03 | 5.6948E−03 | 0.0000E+00 | 0.0000E+00 |
| S7 | −2.3906E−01 | 1.1554E−01 | 0.0000E+00 | 0.0000E+00 |
| S8 | −1.4455E−03 | 3.6581E−03 | 0.0000E+00 | 0.0000E+00 |
| S9 | −3.4576E+00 | 2.1617E+00 | −7.7373E−01 | 1.1997E−01 |
| S10 | −3.6755E−01 | 1.1750E−01 | −2.0587E−02 | 1.5236E−03 |
| S11 | −1.9178E−08 | 3.8623E−09 | 0.0000E+00 | 0.0000E+00 |
| S12 | 1.1333E−07 | −6.0665E−09 | 0.0000E+00 | 0.0000E+00 |

TTL/ImgH=1.36, where TTL is the distance on the optical axis from the center of the object-side surface S1 of the first lens E1 to the image plane S15, and ImgH is half of the diagonal length of the effective pixel area on the image plane S15;

f5/f6=−1.45, where f5 is the effective focal length of the fifth lens E5, and f6 is the effective focal length of the sixth lens E6;

f1/R1=2.13, where f1 is the effective focal length of the first lens E1, and R1 is the radius of curvature of the object-side surface S1 of the first lens E1;

(R3+R4)/(R3−R4)=4.10, where R3 is the radius of curvature of the object-side surface S3 of the second lens E2, and R4 is the radius of curvature of the image-side surface S4 of the second lens E2;

CT1/CT6=2.25, where CT1 is the center thickness on the optical axis of the first lens E1, and CT6 is the center thickness on the optical axis of the sixth lens E6;

|f5/R10|=2.91, where f5 is the effective focal length of the fifth lens E5, and R10 is the radius of curvature of the image-side surface S10 of the fifth lens E5;

|f/f5|+|f/f6|=2.14, where f is the total effective focal length of the optical imaging lens assembly, f5 is the effective focal length of the fifth lens E5, and f6 is the effective focal length of the sixth lens E6;

R11/R12=−0.24, wherein R11 is the radius of curvature of the object-side surface S11 of the sixth lens E6, and R12 is the radius of curvature of the image-side surface S12 of the sixth lens E6;

TTL/ΣAT=2.81, where TTL is the distance on the optical axis from the center of the object-side surface S1 of the first lens E1 to the image plane S15, and ΣAT is the sum of the spaced distances on optical axis between any adjacent two lenses of the first lens E1 to the sixth lens E6;

|f6/CT6|=11.32, where f6 is the effective focal length of the sixth lens E6, and CT6 is the center thickness on the optical axis of the sixth lens E6;

f/R12=0.45, where f is the total effective focal length of the optical imaging lens assembly, and R12 is the radius of curvature of the image-side surface S12 of the sixth lens E6;

T56/(T12+T23+T34)=2.71, where T56 is the spaced distance on the optical axis between the fifth lens E5 and the sixth lens E6, T12 is the spaced distance on the optical axis between the first lens E1 and the second lens E2, T23 is the spaced distance on the optical axis between the second lens E2 and the third lens E3, and T34 is the spaced distance on the optical axis between the third lens E3 and the fourth lens E4.

Figure 2D:
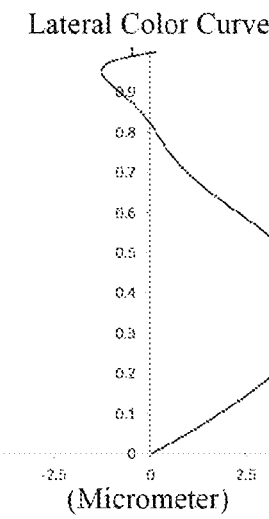

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatism curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion at different viewing angles. FIG. 2D illustrates a lateral color curve of the optical imaging lens assembly according to embodiment 1, representing deviations of different image heights on an image plane after light passes through the optical imaging lens assembly. It can be seen from FIG. 2A to FIG. 2D that the optical imaging lens assembly provided in embodiment 1 can achieve good image quality.

Embodiment 2

Figure 3:
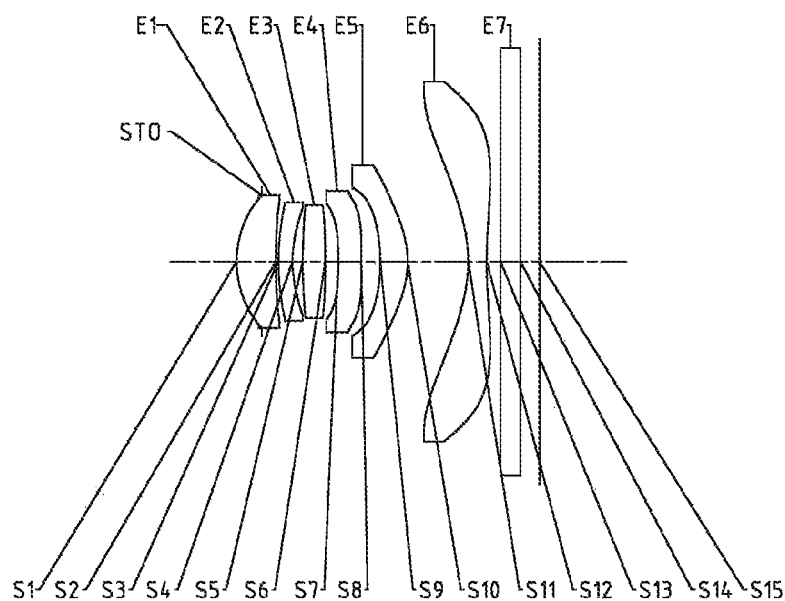
FIG. 3 illustrates a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the image plane S15.

Table 4 shows surface type, radius of curvature, thickness, material and conic coefficient of each lens of the optical imaging lens assembly in embodiment 2, wherein the units for the radius of curvature and the thickness are millimeter (mm).

TABLE 4

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| STO | spherical | infinite | −0.4083 | | | |
| S1 | aspheric | 1.6645 | 0.6386 | 1.55 | 56.1 | 0.2513 |
| S2 | aspheric | 9.9268 | 0.0400 | | | 0.8501 |
| S3 | aspheric | 3.2793 | 0.2317 | 1.67 | 20.4 | 0.3549 |
| S4 | aspheric | 2.0456 | 0.1677 | | | 2.6788 |

TABLE 4-continued

| Surface number | Surface type | Radius of curvature | Thickness | Material Refractive index | Abbe number | Conic coefficient |
|---|---|---|---|---|---|---|
| S5 | aspheric | 11.9923 | 0.3647 | 1.55 | 56.1 | 94.8898 |
| S6 | aspheric | −17.4092 | 0.2098 | | | −83.0008 |
| S7 | aspheric | −9.2164 | 0.3767 | 1.67 | 20.4 | 71.3057 |
| S8 | aspheric | −171.5767 | 0.3072 | | | −22.8549 |
| S9 | aspheric | −2.8772 | 0.4456 | 1.65 | 23.5 | 3.6181 |
| S10 | aspheric | −1.5782 | 0.9849 | | | −1.3695 |
| S11 | aspheric | −2.3305 | 0.3017 | 1.54 | 55.7 | −7.6924 |
| S12 | aspheric | 8.1410 | 0.2226 | | | 5.5286 |
| S13 | spherical | infinite | 0.3250 | 1.52 | 64.2 | |
| S14 | spherical | infinite | 0.3088 | | | |
| S15 | spherical | infinite | | | | |

As can be seen from Table 4, in embodiment 2, the object-side surface and the image-side surface of any one of the first lens E1 to the sixth lens E6 are aspheric. Table 5 shows high-order coefficients applicable to each aspheric surface in embodiment 2, wherein the surface shape of each aspheric surface can be defined by the formula (1) given in the above embodiment 1.

TABLE 5

| Surface number | A4 | A6 | A8 | A10 | A12 |
|---|---|---|---|---|---|
| S1 | −1.1184E−02 | 5.1782E−02 | −2.5022E−01 | 7.1557E−01 | −1.3117E+00 |
| S2 | −4.3784E−02 | 1.8319E−01 | −3.6200E−01 | 5.9610E−01 | −9.3667E−01 |
| S3 | −1.1388E−01 | 1.9106E−01 | −2.1074E−01 | −3.2807E−02 | 5.1666E−01 |
| S4 | −1.1689E−01 | −1.8656E−03 | 2.0306E−01 | −1.0068E+00 | 2.0632E+00 |
| S5 | −9.7763E−04 | 8.6436E−02 | −7.5448E−01 | 3.3367E+00 | −9.0040E+00 |
| S6 | −3.3680E−02 | 1.2347E−02 | 9.5261E−02 | −7.0547E−01 | 2.3616E+00 |
| S7 | −1.5640E−01 | −7.5555E−03 | 1.5827E−01 | −6.6553E−01 | 1.4078E+00 |
| S8 | −1.1128E−01 | −1.1278E−01 | 4.6103E−01 | −1.2177E+00 | 1.9487E+00 |
| S9 | 5.5757E−02 | −3.0663E−01 | 1.1007E+00 | −2.6069E+00 | 4.0393E+00 |
| S10 | 6.3240E−02 | −1.4705E−01 | 3.5045E−01 | −4.4992E−01 | 3.4722E−01 |
| S11 | −9.9404E−03 | 3.2747E−03 | −1.8690E−03 | 1.0433E−03 | −3.3725E−04 |
| S12 | −2.0594E−02 | 2.1657E−03 | −1.0021E−03 | 4.1001E−04 | −1.1587E−04 |

| Surface number | A14 | A16 | A18 | A20 |
|---|---|---|---|---|
| S1 | 1.5444E+00 | −1.1326E+00 | 4.7187E−01 | −8.5638E−02 |
| S2 | 1.3322E+00 | −1.3467E+00 | 7.8162E−01 | −1.9650E−01 |
| S3 | −6.9159E−01 | 3.2866E−01 | 2.8481E−02 | −6.2094E−02 |
| S4 | −2.1128E+00 | 6.3700E−01 | 6.7058E−01 | −4.9591E−01 |
| S5 | 1.4983E+01 | −1.5041E+01 | 8.5525E+00 | −2.1430E+00 |
| S6 | −4.4596E+00 | 4.8266E+00 | −2.7598E+00 | 6.3442E−01 |
| S7 | −1.4359E+00 | 3.6147E−01 | 4.4984E−01 | −2.7523E−01 |
| S8 | −1.9765E+00 | 1.2839E+00 | −5.0157E−01 | 9.2201E−02 |
| S9 | −4.2218E+00 | 2.8469E+00 | −1.1087E+00 | 1.8754E−01 |
| S10 | −1.6680E−01 | 4.8106E−02 | −7.4574E−03 | 4.6000E−04 |
| S11 | 6.5744E−05 | −7.6814E−06 | 4.9496E−07 | −1.3530E−08 |
| S12 | 1.9820E−05 | −2.0602E−06 | 1.2224E−07 | −3.1630E−09 |

Table 6 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 2.

TABLE 6

| f1 (mm) | 3.57 | f6 (mm) | −3.34 |
|---|---|---|---|
| f2 (mm) | −8.82 | f (mm) | 4.25 |
| f3 (mm) | 13.07 | TTL (mm) | 4.93 |

TABLE 6-continued

| f4 (mm) | −14.62 | ImgH (mm) | 3.64 |
|---|---|---|---|
| f5 (mm) | 4.78 | | |

Figure 4A:
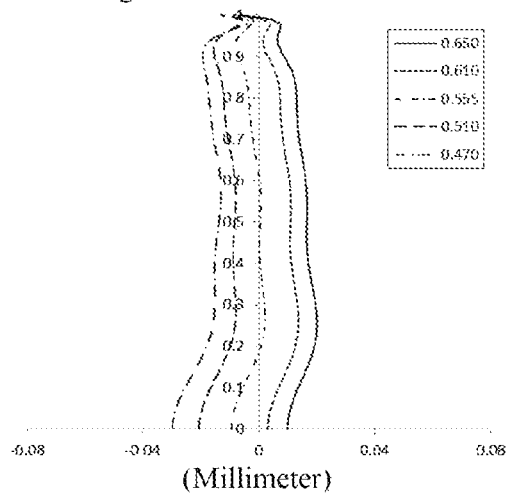
FIGS. 4A to 4D illustrate a longitudinal aberration curve, an astigmatic curve, a distortion curve and a lateral color curve of the optical imaging lens assembly of the embodiment 2, respectively.
Figure 4B:
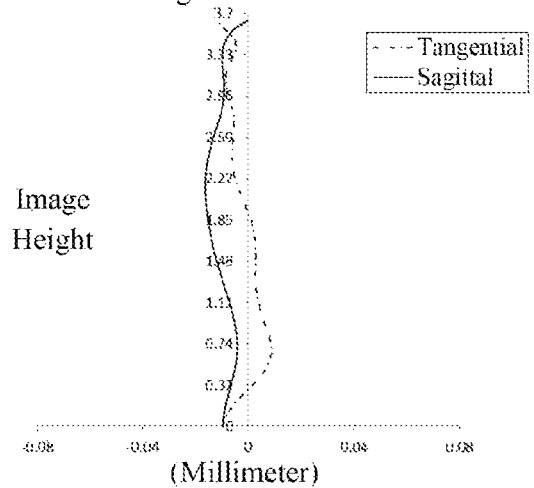
Figure 4C:
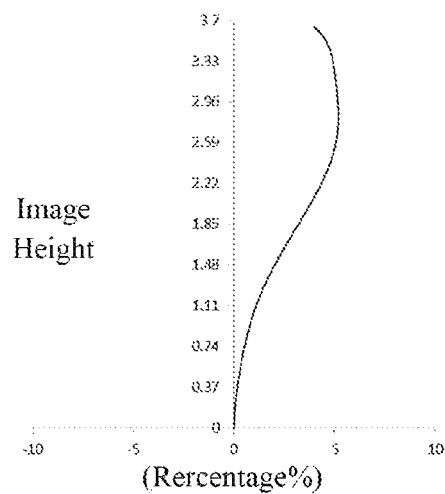
Figure 4D:
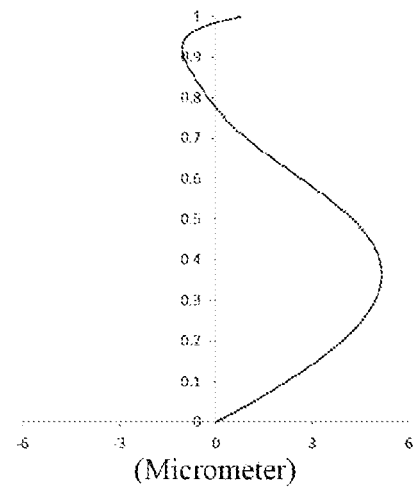

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatism curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion at different viewing angles. FIG. 4D illustrates a lateral color curve of the optical imaging lens assembly according to embodiment 2, representing deviations of different image heights on an image plane after light passes through the optical imaging lens assembly. It can be seen from FIG. 4A to FIG. 4D that the optical imaging lens assembly provided in embodiment 2 can achieve good image quality.

Embodiment 3

Figure 5:
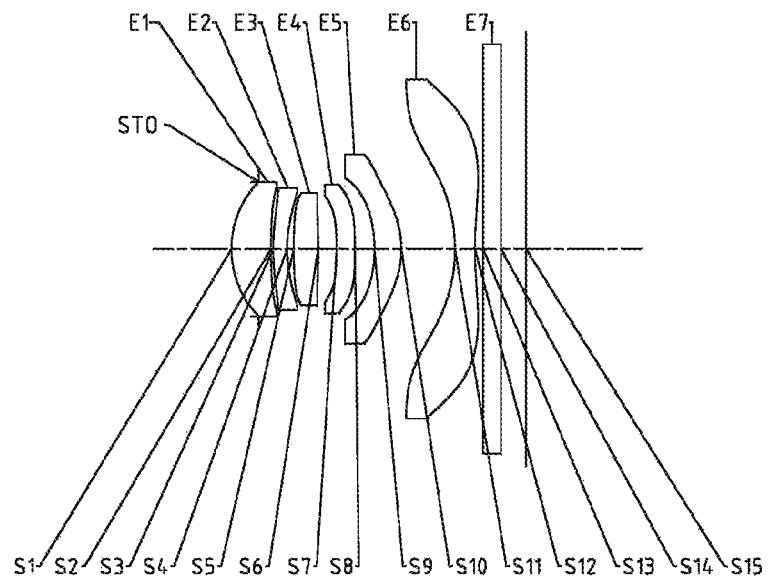
FIG. 5 illustrates a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the image plane S15.

Table 7 shows surface type, radius of curvature, thickness, material and conic coefficient of each lens of the optical imaging lens assembly in embodiment 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4067 | | | |
| S1 | aspheric | 1.6761 | 0.6591 | 1.55 | 56.1 | −4.4428E−08 |
| S2 | aspheric | 8.8325 | 0.0400 | | | −2.5886E−08 |
| S3 | aspheric | 3.5586 | 0.2313 | 1.67 | 20.4 | −3.7795E−07 |
| S4 | aspheric | 2.1739 | 0.1114 | | | 5.1041E−07 |
| S5 | aspheric | 10.2148 | 0.4087 | 1.55 | 56.1 | 98.9997 |
| S6 | aspheric | −11.4757 | 0.3106 | | | −98.9954 |
| S7 | aspheric | −6.1610 | 0.3056 | 1.67 | 20.4 | 27.9750 |
| S8 | aspheric | −10.3352 | 0.3254 | | | 78.8237 |
| S9 | aspheric | −2.3762 | 0.4509 | 1.65 | 23.5 | 2.5588 |
| S10 | aspheric | −1.5860 | 0.8974 | | | −0.9157 |
| S11 | aspheric | −2.5757 | 0.3355 | 1.54 | 55.7 | −9.3556 |
| S12 | aspheric | 8.1850 | 0.1350 | | | −87.1679 |
| S13 | spherical | infinite | 0.3000 | 1.52 | 64.2 | |
| S14 | spherical | infinite | 0.4191 | | | |
| S15 | spherical | infinite | | | | |

As can be seen from Table 7, in embodiment 3, the object-side surface and the image-side surface of any one of the first lens E1 to the sixth lens E6 are aspheric. Table 8 below shows high-order coefficients applicable to each aspheric surface in embodiment 3, wherein the surface shape of each aspheric surface can be defined by the formula (1) given in the above embodiment 1.

TABLE 8

| Surface number | A4 | A6 | A8 | A10 | A12 |
|---|---|---|---|---|---|
| S1 | −3.7669E−03 | 3.4483E−02 | −1.5494E−01 | 4.5018E−01 | −8.1869E−01 |
| S2 | −4.0305E−02 | 3.2141E−01 | −1.0148E+00 | 2.2212E+00 | −3.3512E+00 |
| S3 | −1.2807E−01 | 3.8777E−01 | −1.2449E+00 | 2.7981E+00 | −4.4043E+00 |
| S4 | −9.9363E−02 | 1.2451E−01 | −1.3488E−01 | −4.6594E−01 | 2.3616E+00 |
| S5 | 7.5589E−03 | 1.4372E−01 | −5.4992E−01 | 2.0099E+00 | −4.5202E+00 |
| S6 | −2.0192E−03 | −8.0106E−02 | 7.7614E−01 | −2.9608E+00 | 7.1739E+00 |
| S7 | −1.8873E−01 | 3.6031E−01 | −2.3627E+00 | 8.9388E+00 | −2.1829E+01 |
| S8 | −1.4275E−01 | 9.5201E−02 | −4.3489E−01 | 8.8026E−01 | −1.1293E+00 |
| S9 | −8.8243E−03 | 9.4781E−02 | −4.2792E−01 | 1.0262E+00 | −1.7588E+00 |

TABLE 8-continued

| | | | | | |
|---|---|---|---|---|---|
| S10 | 4.4766E−02 | −7.1045E−02 | 2.2591E−01 | −4.1177E−01 | 4.3232E−01 |
| S11 | −1.6068E−02 | −2.7206E−02 | 1.6897E−02 | −3.9929E−03 | 4.6976E−04 |
| S12 | 2.9703E−02 | −5.1703E−02 | 2.9856E−02 | −1.0659E−02 | 2.4681E−03 |

| Surface number | A14 | A16 | A18 | A20 |
|---|---|---|---|---|
| S1 | 9.3730E−01 | −6.5297E−01 | 2.5311E−01 | −4.1865E−02 |
| S2 | 3.4520E+00 | −2.3280E+00 | 9.3698E−01 | −1.7179E−01 |
| S3 | 4.6579E+00 | −3.1263E+00 | 1.2085E+00 | −2.0656E−01 |
| S4 | −4.8466E+00 | 5.5083E+00 | −3.3759E+00 | 8.6361E−01 |
| S5 | 6.5472E+00 | −5.8343E+00 | 2.8930E+00 | −6.1942E−01 |
| S6 | −1.0760E+01 | 9.7178E+00 | −4.7666E+00 | 9.5450E−01 |
| S7 | 3.4288E+01 | −3.3500E+01 | 1.8558E+01 | −4.4585E+00 |
| S8 | 9.1131E−01 | −3.5962E−01 | 5.4320E−03 | 3.1792E−02 |
| S9 | 1.9403E+00 | −1.2347E+00 | 4.0810E−01 | −5.4172E−02 |
| S10 | −2.6146E−01 | 9.0140E−02 | −1.6514E−02 | 1.2477E−03 |
| S11 | −2.4081E−05 | −2.5006E−07 | 7.9255E−08 | −2.4254E−09 |
| S12 | −3.7056E−04 | 3.4643E−05 | −1.8209E−06 | 4.0903E−08 |

Table 9 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 3.

TABLE 9

| f1 (mm) | 3.67 | f6 (mm) | −3.61 |
|---|---|---|---|
| f2 (mm) | −8.98 | f (mm) | 4.25 |
| f3 (mm) | 9.97 | TTL (mm) | 4.93 |
| f4 (mm) | −23.56 | ImgH (mm) | 3.65 |
| f5 (mm) | 6.05 | | |

Figure 6A:
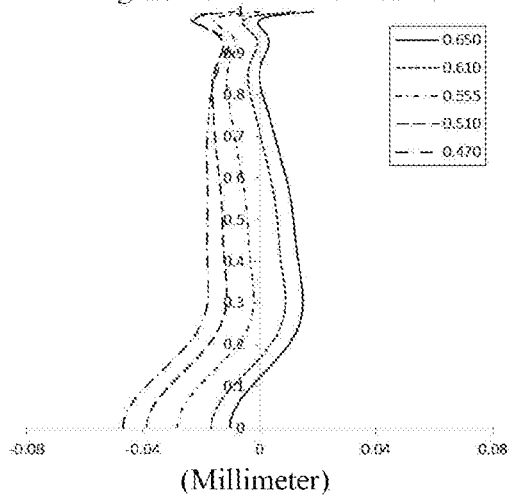
Figure 6B:
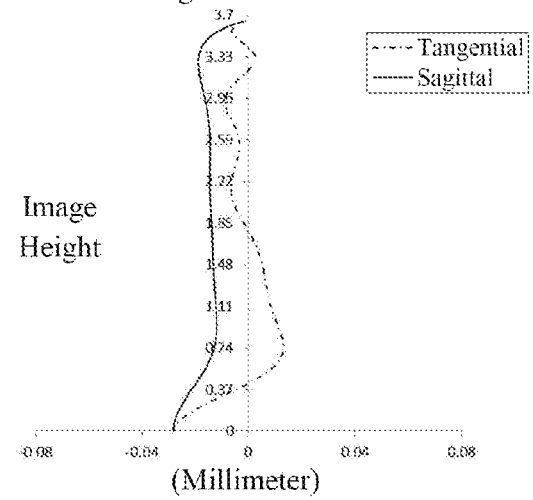

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatism curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion at different viewing angles. FIG. 6D illustrates a lateral color curve of the optical imaging lens assembly according to embodiment 3, representing deviations of different image heights on an image plane after light passes through the optical imaging lens assembly. It can be seen from FIG. 6A to FIG. 6D that the optical imaging lens assembly provided in embodiment 3 can achieve good image quality.

Embodiment 4

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the image plane S15.

Table 10 shows surface type, radius of curvature, thickness, material and conic coefficient of each lens of the optical imaging lens assembly in embodiment 4, wherein the units for the radius of curvature and the thickness are millimeter (mm).

TABLE 10

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.4309 | | | |
| S1 | aspheric | 1.7322 | 0.6471 | 1.55 | 56.1 | −4.4429E−08 |

TABLE 10-continued

| Surface number | Surface type | Radius of curvature | Thickness | Material Refractive index | Abbe number | Conic coefficient |
|---|---|---|---|---|---|---|
| S2 | aspheric | 10.1539 | 0.0400 | | | −2.5886E−08 |
| S3 | aspheric | 2.7309 | 0.2300 | 1.67 | 20.4 | −3.7795E−07 |
| S4 | aspheric | 1.8410 | 0.1482 | | | 5.1041E−07 |
| S5 | aspheric | 9.9958 | 0.4215 | 1.55 | 56.1 | 98.9997 |
| S6 | aspheric | −11.7282 | 0.3194 | | | −98.9954 |
| S7 | aspheric | −6.2475 | 0.3000 | 1.67 | 20.4 | 22.8140 |
| S8 | aspheric | −10.2976 | 0.3064 | | | 78.8237 |
| S9 | aspheric | −2.3927 | 0.4673 | 1.65 | 23.5 | 2.5168 |
| S10 | aspheric | −1.5855 | 0.8667 | | | −0.9037 |
| S11 | aspheric | −2.7736 | 0.3000 | 1.54 | 55.7 | −8.3061 |
| S12 | aspheric | 5.5232 | 0.1226 | | | −73.7770 |
| S13 | spherical | infinite | 0.3560 | 1.52 | 64.2 | |
| S14 | spherical | infinite | 0.4050 | | | |
| S15 | spherical | infinite | | | | |

As can be seen from Table 10, in embodiment 4, the object-side surface and the image-side surface of any one of the first lens E1 to the sixth lens E6 are aspheric. Table 11 below shows high-order coefficients applicable to each aspheric surface in embodiment 4, wherein the surface shape of each aspheric surface can be defined by the formula (1) given in the above embodiment 1.

TABLE 11

| Surface number | A4 | A6 | A8 | A10 | A12 |
|---|---|---|---|---|---|
| S1 | −9.5799E−03 | 4.8867E−02 | −2.0451E−01 | 5.1101E−01 | −7.9891E−01 |
| S2 | −2.9321E−02 | 2.3662E−01 | −5.7242E−01 | 7.4796E−01 | −3.1344E−01 |
| S3 | −1.0816E−01 | 3.3969E−01 | −1.0022E+00 | 2.1697E+00 | −3.5562E+00 |
| S4 | −7.8614E−02 | −1.1441E−02 | 9.5797E−01 | −4.8080E+00 | 1.2884E+01 |
| S5 | 3.9832E−05 | 2.4171E−01 | −1.4573E+00 | 7.0636E+00 | −2.0577E+01 |
| S6 | −7.9546E−03 | −1.6541E−01 | 1.4232E+00 | −6.1472E+00 | 1.7006E+01 |
| S7 | −1.8636E−01 | 3.5528E−01 | −2.4601E+00 | 9.9147E+00 | −2.5670E+01 |
| S8 | −1.4193E−01 | 1.4982E−01 | −7.3408E−01 | 1.8414E+00 | −2.9617E+00 |
| S9 | 8.9171E−03 | −2.2019E−02 | 1.4448E−01 | −7.9070E−01 | 1.8330E+00 |
| S10 | 4.9810E−02 | −6.3412E−02 | 1.7664E−01 | −3.1004E−01 | 3.1180E−01 |
| S11 | −3.1055E−02 | 2.6237E−03 | −6.1987E−03 | 5.7458E−03 | −2.0034E−03 |
| S12 | 9.4701E−03 | −3.4507E−02 | 2.3226E−02 | −9.8208E−03 | 2.6893E−03 |

| Surface number | A14 | A16 | A18 | A20 |
|---|---|---|---|---|
| S1 | 7.8524E−01 | −4.7011E−01 | 1.5611E−01 | −2.1905E−02 |
| S2 | −5.1668E−01 | 8.7356E−01 | −5.2438E−01 | 1.1867E−01 |
| S3 | 4.0786E+00 | −3.0649E+00 | 1.3627E+00 | −2.6946E−01 |
| S4 | −2.0351E+01 | 1.8809E+01 | −9.4553E+00 | 2.0050E+00 |
| S5 | 3.7523E+01 | −4.1417E+01 | 2.5092E+01 | −6.3944E+00 |
| S6 | −2.9863E+01 | 3.2287E+01 | −1.9536E+01 | 5.0395E+00 |
| S7 | 4.2472E+01 | −4.3426E+01 | 2.4990E+01 | −6.2072E+00 |
| S8 | 2.9871E+00 | −1.6994E+00 | 4.3521E−01 | −1.5054E−02 |
| S9 | −2.4805E+00 | 2.0483E+00 | −9.3725E−01 | 1.7926E−01 |
| S10 | −1.7727E−01 | 5.6175E−02 | −9.1966E−03 | 5.9689E−04 |
| S11 | 3.6550E−04 | −3.7594E−05 | 2.0773E−06 | −4.8134E−08 |
| S12 | −4.7669E−04 | 5.2565E−05 | −3.2610E−06 | 8.6735E−08 |

Table 12 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment

TABLE 12

| f1 (mm) | 3.72 | f6 (mm) | −3.40 |
| f2 (mm) | −9.45 | f (mm) | 4.25 |

TABLE 12-continued

| f3 (mm) | 9.95 | TTL (mm) | 4.93 |
| f4 (mm) | −24.55 | ImgH (mm) | 3.65 |
| f5 (mm) | 5.94 | | |

Figure 8A:
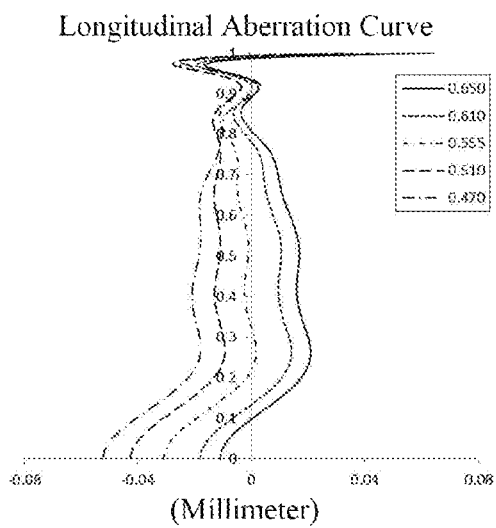
FIGS. 8A to 8D illustrate a longitudinal aberration curve, an astigmatic curve, a distortion curve and a lateral color curve of the optical imaging lens assembly of the embodiment 4, respectively.
Figure 8B:
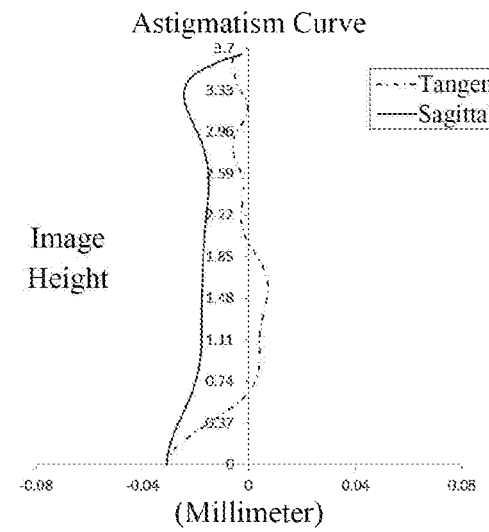
Figure 8C:
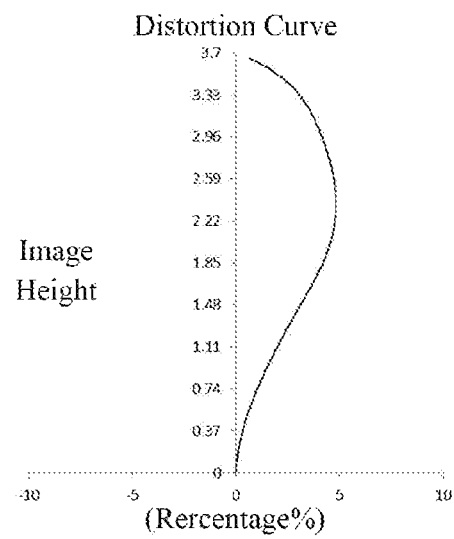
Figure 8D:
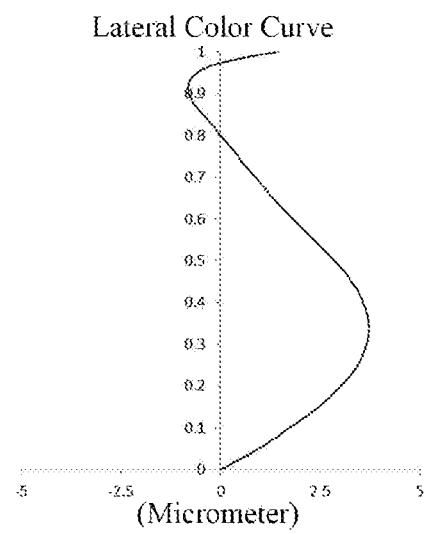

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatism curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion at different viewing angles. FIG. 8D illustrates a lateral color curve of the optical imaging lens assembly according to embodiment 4, representing deviations of different image heights on an image plane after light passes through the optical imaging lens assembly. It can be seen from FIG. 8A to FIG. 8D that the optical imaging lens assembly provided in embodiment 4 can achieve good image quality.

Embodiment 5

Figure 9:
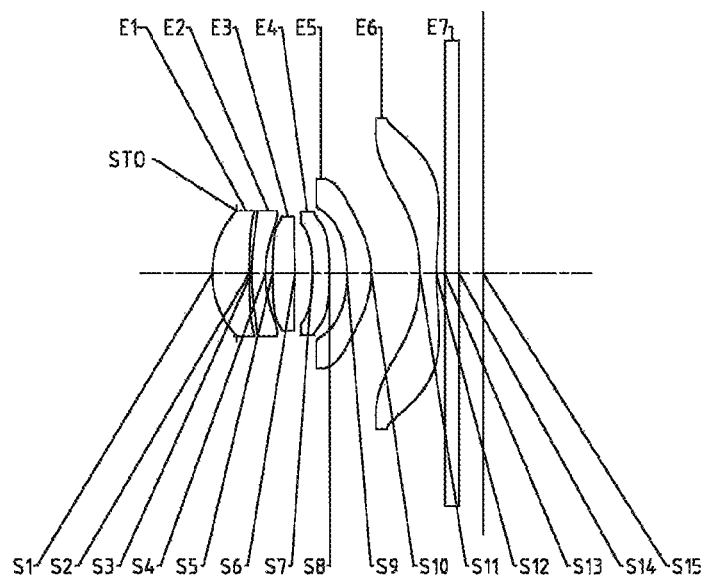
FIG. 9 illustrates a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the image plane S15.

Table 13 shows surface type, radius of curvature, thickness, material and conic coefficient of each lens of the optical imaging lens assembly in embodiment 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4469 | | | |
| S1 | aspheric | 1.7066 | 0.6732 | 1.55 | 56.1 | 0.0702 |
| S2 | aspheric | 13.0814 | 0.0400 | | | −18.1103 |
| S3 | aspheric | 3.4654 | 0.2548 | 1.67 | 20.4 | 0.0139 |
| S4 | aspheric | 2.0437 | 0.1279 | | | −0.5382 |
| S5 | aspheric | 10.4930 | 0.4087 | 1.55 | 56.1 | 99.0000 |
| S6 | aspheric | −12.8262 | 0.3194 | | | −76.4781 |
| S7 | aspheric | −6.4413 | 0.3087 | 1.67 | 20.4 | 22.3218 |
| S8 | aspheric | −10.0508 | 0.3176 | | | 69.3248 |
| S9 | aspheric | −2.3663 | 0.4454 | 1.65 | 23.5 | 2.5549 |
| S10 | aspheric | −1.6383 | 0.8829 | | | −0.8622 |
| S11 | aspheric | −2.8728 | 0.3000 | 1.54 | 55.7 | −7.2277 |
| S12 | aspheric | 5.4425 | 0.1550 | | | −86.5570 |
| S13 | spherical | infinite | 0.2600 | 1.52 | 64.2 | |
| S14 | spherical | infinite | 0.4364 | | | |
| S15 | spherical | infinite | | | | |

As can be seen from Table 13, in embodiment 5, the object-side surface and the image-side surface of any one of the first lens E1 to the sixth lens E6 are aspheric. Table 14 below shows high-order coefficients applicable to each aspheric surface in embodiment 5, wherein the surface shape of each aspheric surface can be defined by the formula (1) given in the above embodiment 1.

TABLE 14

| Surface number | A4 | A6 | A8 | A10 | A12 |
|---|---|---|---|---|---|
| S1 | −9.0012E−03 | 3.0642E−02 | −1.2464E−01 | 2.9225E−01 | −4.3035E−01 |
| S2 | −1.3063E−02 | 1.4554E−01 | −4.1453E−01 | 7.5900E−01 | −8.4517E−01 |
| S3 | −8.3631E−02 | 1.9358E−01 | −6.5689E−01 | 1.6801E+00 | −3.0893E+00 |

TABLE 14-continued

| | | | | | |
|---|---|---|---|---|---|
| S4 | −6.6910E−02 | 3.0908E−02 | 1.2492E−01 | −6.3933E−01 | 1.1746E+00 |
| S5 | 9.6360E−03 | 1.3204E−01 | −8.4481E−01 | 4.4078E+00 | −1.3187E+01 |
| S6 | −1.1716E−02 | −4.7342E−03 | 2.3439E−01 | −9.5137E−01 | 2.7618E+00 |
| S7 | −1.6967E−01 | 2.5010E−01 | −2.1108E+00 | 9.4630E+00 | −2.6549E+01 |
| S8 | −1.1666E−01 | −1.7844E−02 | −6.6137E−02 | −1.4784E−02 | 4.3960E−01 |
| S9 | 5.7497E−02 | −3.8823E−01 | 1.7629E+00 | −5.2465E+00 | 9.4924E+00 |
| S10 | 6.0311E−02 | −1.2040E−01 | 3.5543E−01 | −6.2809E−01 | 6.3014E−01 |
| S11 | −3.4666E−02 | 7.7693E−03 | −1.1679E−02 | 9.0426E−03 | −3.1138E−03 |
| S12 | 3.9143E−03 | −2.8935E−02 | 1.9185E−02 | −8.2837E−03 | 2.3734E−03 |

| Surface number | A14 | A16 | A18 | A20 |
|---|---|---|---|---|
| S1 | 3.9695E−01 | −2.2069E−01 | 6.6888E−02 | −8.2642E−03 |
| S2 | 4.9467E−01 | −5.0723E−02 | −9.3984E−02 | 3.6739E−02 |
| S3 | 3.8082E+00 | −2.9668E+00 | 1.3155E+00 | −2.5085E−01 |
| S4 | −3.4730E−01 | −1.3353E+00 | 1.4476E+00 | −4.3624E−01 |
| S5 | 2.4430E+01 | −2.6842E+01 | 1.5845E+01 | −3.8745E+00 |
| S6 | −4.8270E+00 | 4.9337E+00 | −2.6187E+00 | 5.0438E−01 |
| S7 | 4.6756E+01 | −5.0149E+01 | 2.9938E+01 | −7.6580E+00 |
| S8 | −1.0913E+00 | 1.4063E+00 | −9.3082E−01 | 2.4807E−01 |
| S9 | −1.0877E+01 | 7.7852E+00 | −3.1624E+00 | 5.5220E−01 |
| S10 | −3.6362E−01 | 1.1980E−01 | −2.0962E−02 | 1.5097E−03 |
| S11 | 5.8474E−04 | −6.2982E−05 | 3.6797E−06 | −9.0779E−08 |
| S12 | −4.4512E−04 | 5.2111E−05 | −3.4293E−06 | 9.6489E−08 |

Table 15 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 5.

TABLE 15

| | | | |
|---|---|---|---|
| f1 (mm) | 3.52 | f6 (mm) | −3.46 |
| f2 (mm) | −8.05 | f (mm) | 4.39 |
| f3 (mm) | 10.64 | TTL (mm) | 4.93 |
| f4 (mm) | −27.85 | ImgH (mm) | 3.67 |
| f5 (mm) | 6.66 | | |

Figures 10A, 10B:
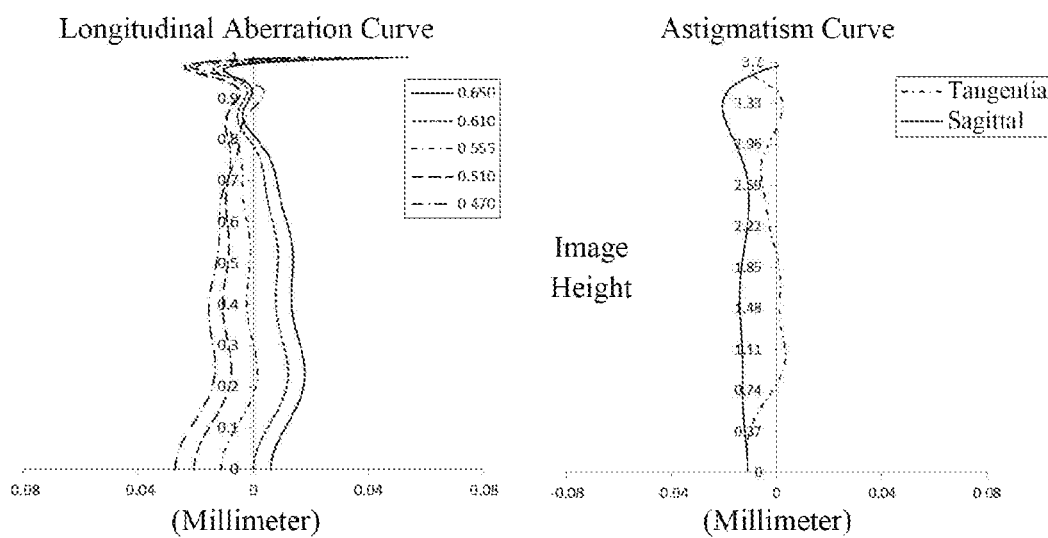
FIGS. 10A to 10D illustrate a longitudinal aberration curve, an astigmatic curve, a distortion curve and a lateral color curve of the optical imaging lens assembly of the embodiment 5, respectively.
Figure 10C:
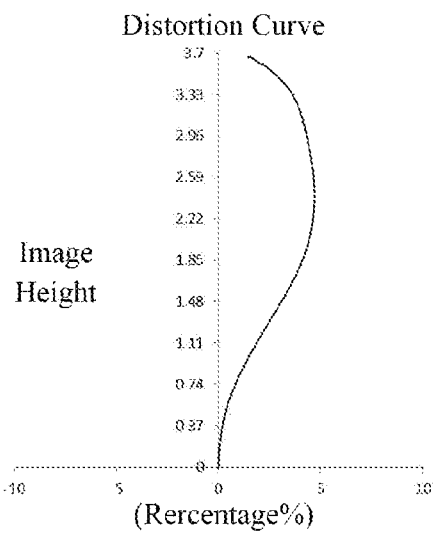
Figure 10D:
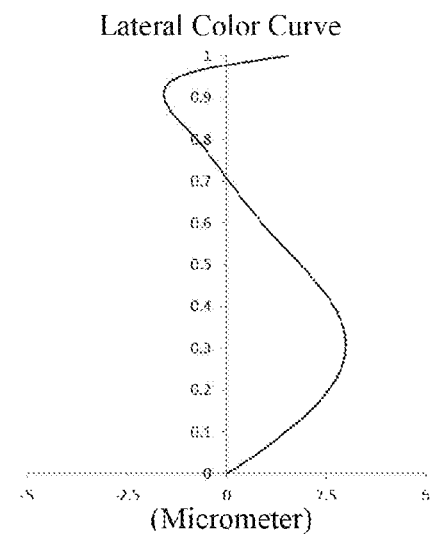

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatism curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion at different viewing angles. FIG. 10D illustrates a lateral color curve of the optical imaging lens assembly according to embodiment 5, representing deviations of different image heights on an image plane after light passes through the optical imaging lens assembly. It can be seen from FIG. 10A to FIG. 10D that the optical imaging lens assembly provided in embodiment 5 can achieve good image quality.

Embodiment 6

Figure 11:
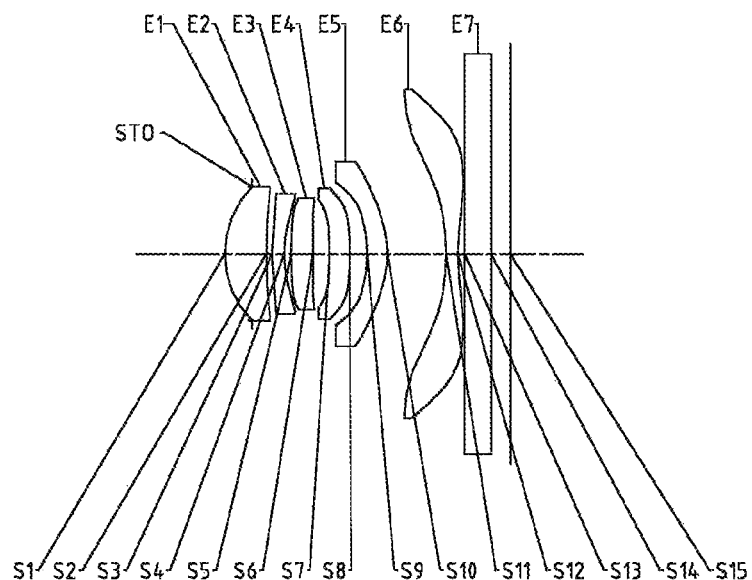
FIG. 11 illustrates a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a positive refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the image plane S15.

Table 16 shows surface type, radius of curvature, thickness, material and conic coefficient of each lens of the optical imaging lens assembly in embodiment 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4507 | | | |
| S1 | aspheric | 1.6350 | 0.7108 | 1.55 | 56.1 | 0.1021 |
| S2 | aspheric | 11.9996 | 0.1000 | | | −98.5751 |
| S3 | aspheric | 3.9449 | 0.2039 | 1.67 | 20.4 | −2.0071 |
| S4 | aspheric | 2.1369 | 0.1197 | | | −0.7133 |
| S5 | aspheric | 10.1853 | 0.3721 | 1.55 | 56.1 | 99.0000 |
| S6 | aspheric | −60.5004 | 0.2810 | | | −43.6815 |
| S7 | aspheric | −9.5898 | 0.3438 | 1.67 | 20.4 | 16.6533 |
| S8 | aspheric | −9.5696 | 0.2990 | | | 67.5922 |
| S9 | aspheric | −2.4027 | 0.3451 | 1.65 | 23.5 | 2.6578 |
| S10 | aspheric | −1.7574 | 1.0006 | | | −0.8605 |
| S11 | aspheric | −4.3311 | 0.2000 | 1.54 | 55.7 | −8.3130 |
| S12 | aspheric | 3.7646 | 0.1174 | | | −27.3497 |
| S13 | spherical | infinite | 0.4499 | 1.52 | 64.2 | |
| S14 | spherical | infinite | 0.3287 | | | |
| S15 | spherical | infinite | | | | |

As can be seen from Table 16, in embodiment 6, the object-side surface and the image-side surface of any one of the first lens E1 to the sixth lens E6 are aspheric. Table 17 below shows high-order coefficients applicable to each aspheric surface in embodiment 6, wherein the surface shape of each aspheric surface can be defined by the formula (1) given in the above embodiment 1.

TABLE 17

| Surface number | A4 | A6 | A8 | A10 | A12 |
|---|---|---|---|---|---|
| S1 | −7.0573E−03 | 1.1176E−02 | −3.9707E−02 | 6.5312E−02 | −4.7782E−02 |
| S2 | 7.7172E−05 | 2.3642E−02 | −8.3505E−03 | −9.4056E−02 | 2.9398E−01 |
| S3 | −7.7769E−02 | 7.1821E−02 | −1.1669E−01 | 8.9300E−02 | 3.4182E−02 |
| S4 | −6.3405E−02 | 8.8321E−02 | −3.3313E−01 | 1.2707E+00 | −3.2829E+00 |
| S5 | 1.0275E−02 | 2.9561E−02 | 1.0226E−01 | −5.2115E−01 | 2.1031E+00 |
| S6 | −1.8485E−02 | 4.0886E−02 | 2.6790E−02 | −1.7019E−01 | 8.5164E−01 |
| S7 | −1.6086E−01 | 1.6176E−01 | −1.2522E+00 | 4.6065E+00 | −1.0574E+01 |
| S8 | −8.8229E−02 | −1.8655E−01 | 8.1958E−01 | −3.1867E+00 | 7.3590E+00 |
| S9 | 7.8081E−02 | −2.5542E−01 | 9.1754E−01 | −2.8278E+00 | 5.0748E+00 |
| S10 | 8.8312E−02 | −1.2283E−01 | 3.4686E−01 | −7.2137E−01 | 8.2690E−01 |
| S11 | −2.6237E−02 | −1.1673E−02 | 9.2744E−03 | −2.1675E−03 | 2.1849E−04 |
| S12 | −4.4742E−03 | −2.6658E−02 | 2.0555E−02 | −9.3310E−03 | 2.7197E−03 |

| Surface number | A14 | A16 | A18 | A20 |
|---|---|---|---|---|
| S1 | −1.0052E−02 | 4.4330E−02 | −2.9676E−02 | 6.9296E−03 |
| S2 | −4.4284E−01 | 3.8712E−01 | −1.8616E−01 | 3.8610E−02 |
| S3 | −2.1170E−01 | 3.0374E−01 | −2.0707E−01 | 5.5537E−02 |
| S4 | 4.9089E+00 | −3.6758E+00 | 9.4792E−01 | 9.5107E−02 |
| S5 | −4.9949E+00 | 7.1077E+00 | −5.4151E+00 | 1.6541E+00 |
| S6 | −1.7992E+00 | 2.0855E+00 | −1.2250E+00 | 2.9198E−01 |
| S7 | 1.5010E+01 | −1.2750E+01 | 5.8478E+00 | −1.1009E+00 |
| S8 | −1.0379E+01 | 8.8647E+00 | −4.2094E+00 | 8.5280E−01 |
| S9 | −5.7344E+00 | 4.1361E+00 | −1.7242E+00 | 3.1102E−01 |
| S10 | −5.3354E−01 | 1.9558E−01 | −3.8235E−02 | 3.1073E−03 |
| S11 | 9.7006E−07 | −2.7629E−06 | 2.8675E−07 | −1.0098E−08 |
| S12 | −5.1555E−04 | 6.0934E−05 | −4.0419E−06 | 1.1427E−07 |

TABLE 18

| f1 (mm) | 3.39 | f6 (mm) | −3.72 |
|---|---|---|---|
| f2 (mm) | −7.32 | f (mm) | 4.34 |
| f3 (mm) | 16.00 | TTL (mm) | 4.87 |
| f4 (mm) | 872.57 | ImgH (mm) | 3.52 |
| f5 (mm) | 8.39 | | |

Table 18 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 6.

Figure 12A:
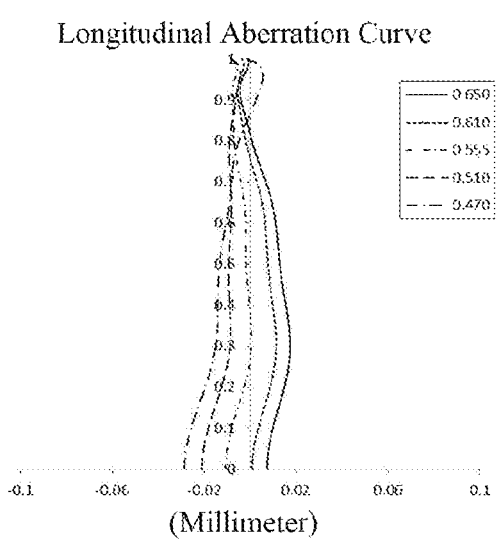
FIGS. 12A to 12D illustrate a longitudinal aberration curve, an astigmatic curve, a distortion curve and a lateral color curve of the optical imaging lens assembly of the embodiment 6, respectively.
Figure 12B:
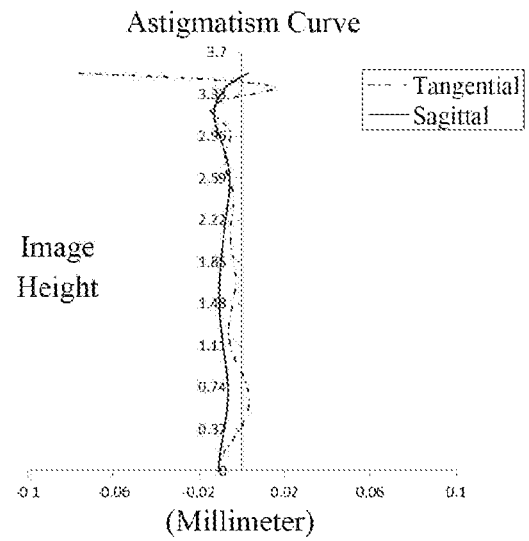
Figure 12C:
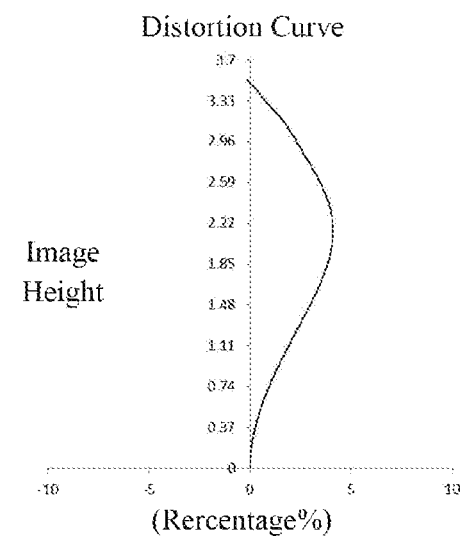
Figure 12D:
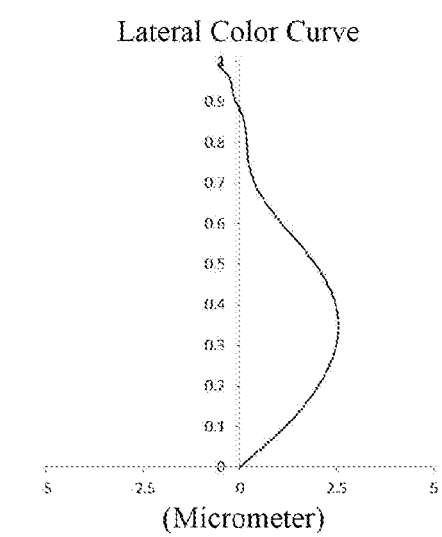

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatism curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion at different viewing angles. FIG. 12D illustrates a lateral color curve of the optical imaging lens assembly according to embodiment 6, representing deviations of different image heights on an image plane after light passes through the optical imaging lens assembly. It can be seen from FIG. 12A to FIG. 12D that the optical imaging lens assembly provided in embodiment 6 can achieve good image quality.

Embodiment 7

Figure 13:
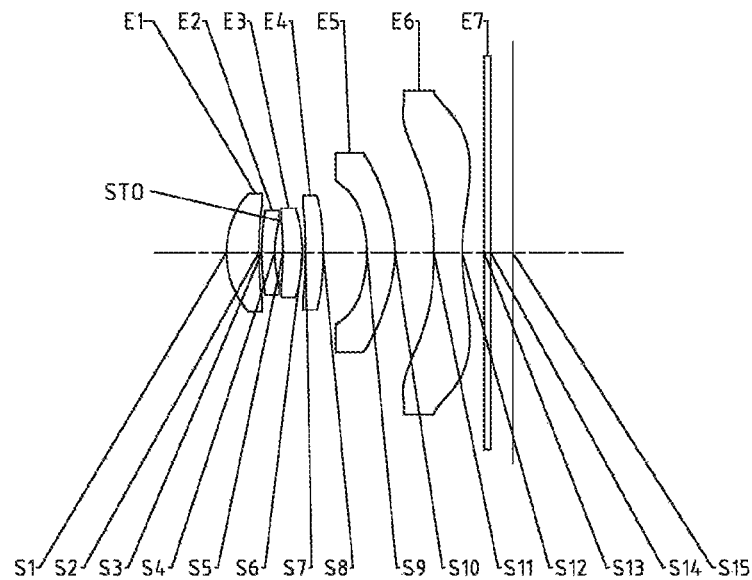
FIG. 13 illustrates a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly according to an exemplary implementation of the present disclosure includes, sequentially from an object side to an image side along an optical axis, a first lens E1, a second lens E2, a diaphragm STO, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. The object-side surface S1 of the first lens E1 is a spherical surface, and the image-side surface S2 of the first lens E1 is an aspheric surface.

The second lens E2 has a negative refractive power. An object-side surface S3 of the second lens E2 is a convex surface, and an image-side surface S4 of the second lens E2 is a concave surface. The object-side surface S3 of the second lens E2 is a spherical surface, and the image-side surface S4 of the second lens E2 is an aspheric surface.

The third lens E3 has a positive refractive power. An object-side surface S5 of the third lens E3 is a concave surface, and an image-side surface S6 of the third lens E3 is a convex surface. The object-side surface S5 of the third lens E3 is an aspheric surface, and the image-side surface S6 of the third lens E3 is a spherical surface.

The fourth lens E4 has a positive refractive power. An object-side surface S7 of the fourth lens E4 is a concave surface, and an image-side surface S8 of the fourth lens E4 is a convex surface. Each of the object-side surface S7 and the image-side surface S8 of the fourth lens E4 is an aspheric surface.

The fifth lens E5 has a positive refractive power. An object-side surface S9 of the fifth lens E5 is a concave surface, and an image-side surface S10 of the fifth lens E5 is a convex surface. Each of the object-side surface S9 and the image-side surface S10 of the fifth lens E5 is an aspheric surface.

The sixth lens E6 has negative refractive power. An object-side surface S11 of the sixth lens E6 is a concave surface, and an image-side surface S12 of the sixth lens E6 is a concave surface. Each of the object-side surface S11 and the image-side surface S12 of the sixth lens E6 is an aspheric surface.

The optical filter E7 has an object-side surface S13 and an image-side surface S14. Light from an object sequentially passes through the respective surfaces S1 to S14 and is finally imaged on the image plane S15.

Table 19 shows surface type, radius of curvature, thickness, material and conic coefficient of each lens of the optical imaging lens assembly in embodiment 7, wherein the units for the radius of curvature and the thickness are millimeter (mm). Table 20 shows high-order coefficients applicable to each aspheric surface in embodiment 7, wherein the surface shape of each aspheric surface can be defined by the formula (1) given in the above embodiment 1. Table 21 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 7.

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | 1.5519 | 0.5526 | 1.55 | 56.1 | 0.0000 |
| S2 | aspheric | 6.8186 | 0.0504 | | | 9.9347 |
| S3 | spherical | 4.4071 | 0.2215 | 1.67 | 20.4 | 0.0000 |
| S4 | aspheric | 2.2073 | 0.0685 | | | 1.7212 |
| STO | spherical | infinite | 0.0721 | | | |
| S5 | aspheric | −5.6006 | 0.3314 | 1.55 | 56.1 | −7.8393 |
| S6 | spherical | −2.4776 | 0.0492 | | | 0.0000 |
| S7 | aspheric | −14.3912 | 0.3037 | 1.67 | 20.4 | 9.9899 |
| S8 | aspheric | −8.2974 | 0.7420 | | | 52.6318 |
| S9 | aspheric | −2.3569 | 0.4804 | 1.65 | 23.5 | −5.2718 |
| S10 | aspheric | −2.1099 | 0.6638 | | | 0.1233 |
| S11 | aspheric | −6.7986 | 0.4795 | 1.54 | 55.7 | 2.5028 |
| S12 | aspheric | 3.3533 | 0.3764 | | | −8.3779 |
| S13 | spherical | infinite | 0.1100 | 1.52 | 64.2 | |
| S14 | spherical | infinite | 0.3748 | | | |
| S15 | spherical | infinite | | | | |

TABLE 20

| Surface number | A4 | A6 | A8 | A10 | A12 | A14 | A16 |
|---|---|---|---|---|---|---|---|
| S2 | 4.3318E−02 | −2.5124E−01 | 1.1222E+00 | −2.7652E+00 | 3.8315E+00 | −2.7429E+00 | 8.0007E−01 |
| S4 | 4.3873E−02 | −4.1885E−01 | 1.8361E+00 | 3.9090E+00 | −5.4467E+01 | 1.6241E+02 | −1.5844E+02 |
| S5 | −3.6192E−02 | 2.5336E−01 | −4.5772E−01 | −3.2184E+00 | 2.6918E+01 | −7.3410E+01 | 7.7604E+01 |
| S7 | −3.9427E−02 | −5.5212E−02 | 2.8053E−01 | −8.1812E−01 | 1.3269E+00 | −9.1448E−01 | 2.3291E−01 |
| S8 | −5.3489E−02 | −2.5244E−02 | 3.1721E−02 | −7.9306E−03 | −1.1449E−02 | 3.3596E−02 | 1.0349E−02 |
| S9 | −4.4080E−02 | −5.9419E−02 | 9.6207E−02 | −1.3922E−01 | 7.8514E−02 | −2.4911E−02 | 5.4569E−03 |
| S10 | 6.7171E−02 | −2.9492E−03 | −1.0943E−02 | 2.6223E−03 | 9.5348E−04 | −2.7333E−04 | 2.1587E−06 |
| S11 | −2.3474E−02 | 2.8717E−03 | 3.4854E−04 | −1.1641E−05 | −4.7959E−06 | 2.0251E−07 | 8.8678E−09 |
| S12 | −3.4044E−02 | 4.4782E−03 | −3.6152E−04 | −3.7528E−05 | 6.0625E−07 | 7.1556E−07 | −1.2791E−08 |

TABLE 21

| | | | |
|---|---|---|---|
| f1 (mm) | 3.55 | f6 (mm) | −4.11 |
| f2 (mm) | −6.91 | f (mm) | 4.28 |
| f3 (mm) | 7.84 | TTL (mm) | 4.88 |
| f4 (mm) | 28.82 | ImgH (mm) | 3.60 |
| f5 (mm) | 17.73 | | |

Figure 14A:
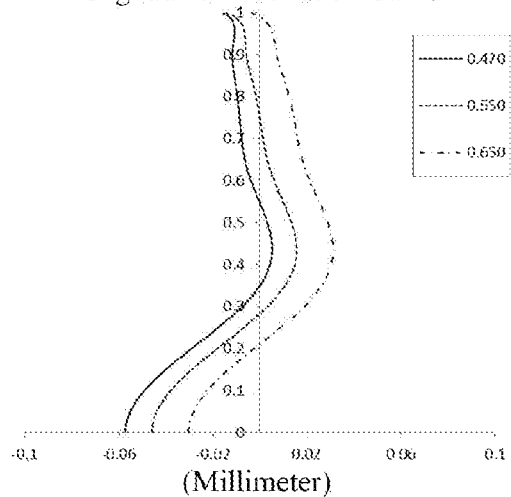
FIGS. 14A to 14D illustrate a longitudinal aberration curve, an astigmatic curve, a distortion curve and a lateral color curve of the optical imaging lens assembly of the embodiment 7, respectively.
Figure 14B:
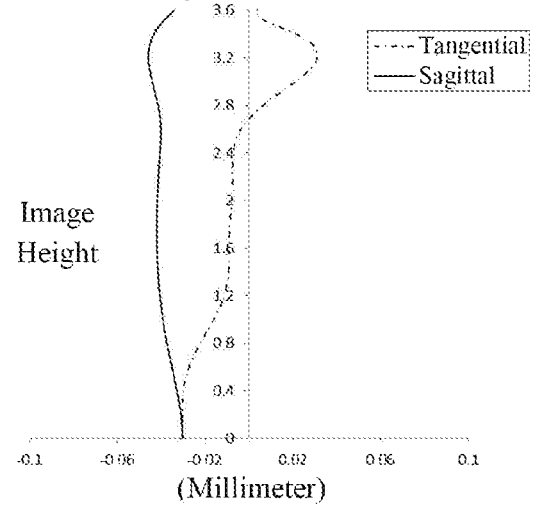
Figure 14C:
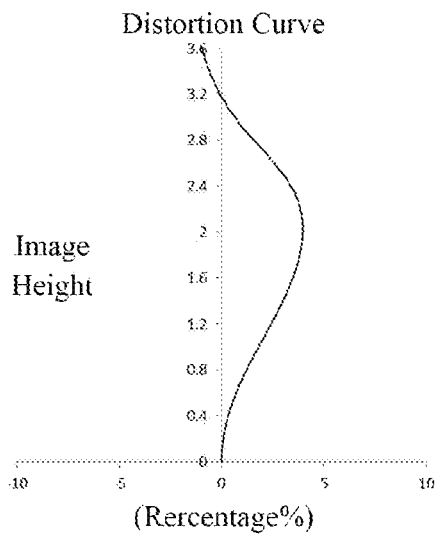
Figure 14D:
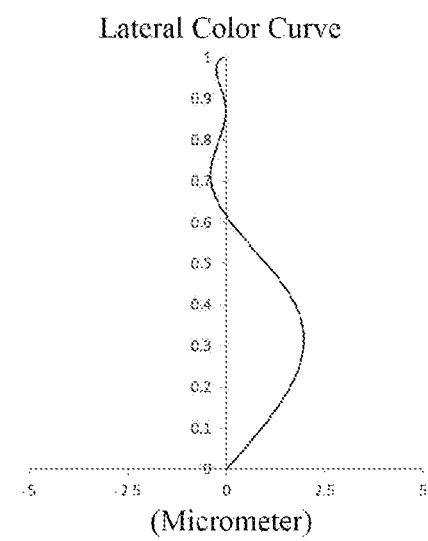

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatism curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion at different viewing angles. FIG. 14D illustrates a lateral color curve of the optical imaging lens assembly according to embodiment 7, representing deviations of different image heights on an image plane after light passes through the optical imaging lens assembly. It can be seen from FIG. 14A to FIG. 14D that the optical imaging lens assembly provided in embodiment 7 can achieve good image quality.

Embodiment 8

Figure 15:
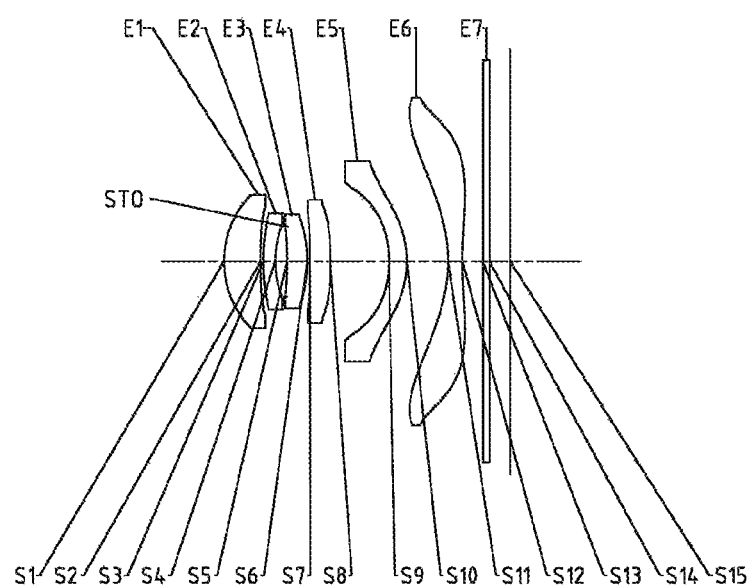
FIG. 15 illustrates a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly according to an exemplary implementation of the present disclosure includes, sequentially from an object side to an image side along an optical axis, a first lens E1, a second lens E2, a diaphragm STO, a third lens E3, a fourth lens E4, a fifth lens E5, a sixth lens E6, an optical filter E7 and an image plane S15.

The first lens E1 has a positive refractive power. An object-side surface S1 of the first lens E1 is a convex surface, and an image-side surface S2 of the first lens E1 is a concave surface. Each of the object-side surface S1 and the image-side surface S2 of the first lens E1 is an aspheric surface.

The second lens E2 has a negative refractive power. An object-side surface S3 of the second lens E2 is a convex surface, and an image-side surface S4 of the second lens E2 is a concave surface. The object-side surface S3 of the second lens E2 is a spherical surface, and the image-side surface S4 of the second lens E2 is an aspheric surface.

The third lens E3 has a positive refractive power. An object-side surface S5 of the third lens E3 is a concave surface, and an image-side surface S6 of the third lens E3 is a convex surface. Each of the object-side surface S5 and the image-side surface S6 of the third lens E3 is an aspheric surface.

The fourth lens E4 has a positive refractive power. An object-side surface S7 of the fourth lens E4 is a concave surface, and an image-side surface S8 of the fourth lens E4 is a convex surface. Each of the object-side surface S7 and the image-side surface S8 of the fourth lens E4 is an aspheric surface.

The fifth lens E5 has a positive refractive power. An object-side surface S9 of the fifth lens E5 is a concave surface, and an image-side surface S10 of the fifth lens E5 is a convex surface. Each of the object-side surface S9 and the image-side surface S10 of the fifth lens E5 is an aspheric surface.

The sixth lens E6 has negative refractive power. An object-side surface S11 of the sixth lens E6 is a concave surface, and an image-side surface S12 of the sixth lens E6 is a concave surface. Each of the object-side surface S11 and the image-side surface S12 of the sixth lens E6 is an aspheric surface.

The optical filter E7 has an object-side surface S13 and an image-side surface S14. Light from an object sequentially passes through the respective surfaces S1 to S14 and is finally imaged on the image plane S15.

Table 22 shows surface type, radius of curvature, thickness, material and conic coefficient of each lens of the optical imaging lens assembly in embodiment 8, wherein the units for the radius of curvature and the thickness are millimeter (mm). Table 23 shows high-order coefficients applicable to each aspheric surface in embodiment 8, wherein the surface shape of each aspheric surface can be defined by the formula (1) given in the above embodiment 1. Table 24 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 8.

TABLE 22

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.6404 | 0.6263 | 1.55 | 56.1 | 0.0296 |
| S2 | aspheric | 10.8411 | 0.0465 | | | 10.0000 |
| S3 | spherical | 3.6885 | 0.2049 | 1.67 | 20.4 | 0.0000 |
| S4 | aspheric | 1.7451 | 0.1528 | | | 1.2074 |
| STO | spherical | infinite | 0.0469 | | | |
| S5 | aspheric | −5.6892 | 0.3461 | 1.55 | 56.1 | −1.1628 |
| S6 | aspheric | −2.4523 | 0.0499 | | | 2.7368 |
| S7 | aspheric | −24.0099 | 0.3465 | 1.67 | 20.4 | 1.2347 |
| S8 | aspheric | −8.3378 | 1.0024 | | | 56.2185 |
| S9 | aspheric | −2.1669 | 0.3065 | 1.65 | 23.5 | 1.2527 |
| S10 | aspheric | −1.7584 | 0.7042 | | | −0.7618 |
| S11 | aspheric | −2.6277 | 0.2478 | 1.54 | 55.7 | −2.8585 |
| S12 | aspheric | 7.0732 | 0.3538 | | | −10.0001 |
| S13 | spherical | infinite | 0.1100 | 1.52 | 64.2 | |
| S14 | spherical | infinite | 0.3531 | | | |
| S15 | spherical | infinite | | | | |

TABLE 23

| Surface number | A4 | A6 | A8 | A10 | A12 | A14 | A16 |
|---|---|---|---|---|---|---|---|
| S1 | −2.0817E−03 | 3.9568E−03 | −2.7906E−03 | 8.7845E−04 | 7.2506E−04 | 1.4175E−04 | 2.5376E−04 |
| S2 | 8.6133E−02 | −2.9341E−01 | 1.1347E+00 | −2.6961E+00 | 3.7818E+00 | −2.8374E+00 | 8.9009E−01 |
| S4 | 2.9707E−03 | −3.0769E−01 | 8.9952E−01 | 5.0008E+00 | −3.5433E+01 | 7.8993E+01 | −6.1121E+01 |
| S5 | −4.7928E−02 | 3.8356E−01 | −1.0269E+00 | −2.9588E+00 | 2.7779E+01 | −6.5934E+01 | 5.3873E+01 |
| S6 | −3.1558E−02 | 3.0829E−02 | 4.7907E−01 | −1.1657E+00 | 1.7497E−01 | 2.2863E+00 | −2.1273E+00 |
| S7 | −1.1410E−01 | 1.2401E−01 | 1.1928E−01 | −8.2838E−01 | 1.3867E+00 | −8.7222E−01 | 1.7502E−01 |
| S8 | −7.7965E−02 | −1.5973E−02 | 4.8852E−02 | −3.5578E−02 | −2.5461E−02 | 4.8139E−02 | 4.0660E−03 |
| S9 | −9.0989E−02 | 2.5896E−02 | −3.8605E−02 | 3.3027E−03 | −5.9476E−03 | −1.5079E−03 | 2.5546E−03 |
| S10 | −3.0412E−02 | 2.6098E−02 | 1.4862E−03 | −6.0006E−04 | −3.0753E−04 | −3.0425E−05 | 2.2202E−05 |
| S11 | 6.7960E−04 | 8.4440E−04 | 5.6544E−05 | −3.9863E−06 | −1.0622E−06 | −5.5047E−08 | 1.9926E−08 |
| S12 | −2.8057E−02 | 2.3245E−03 | −1.4220E−04 | −2.4462E−05 | −1.2287E−07 | 1.2816E−07 | 3.6232E−08 |

TABLE 24

| f1 (mm) | 3.46 | f (mm) | 4.28 |
|---|---|---|---|
| f2 (mm) | −5.19 | TTL (mm) | 4.90 |
| f3 (mm) | 7.60 | ImgH (mm) | 3.63 |
| f4 (mm) | 18.99 | | |
| f5 (mm) | 11.19 | | |
| f6 (mm) | −3.54 | | |

Figure 16A:
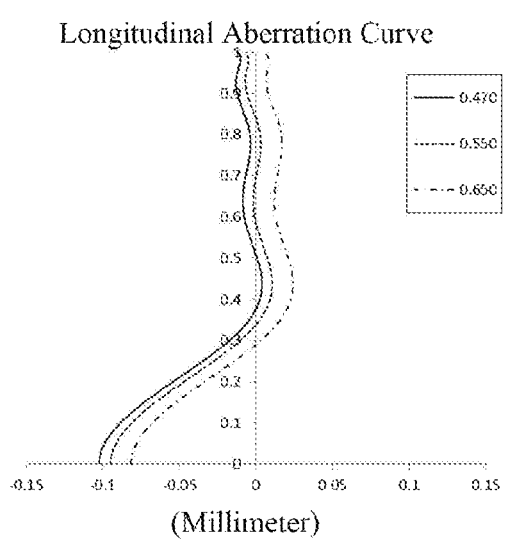
FIGS. 16A to 16D illustrate a longitudinal aberration curve, an astigmatic curve, a distortion curve and a lateral color curve of the optical imaging lens assembly of the embodiment 8, respectively.
Figure 16B:
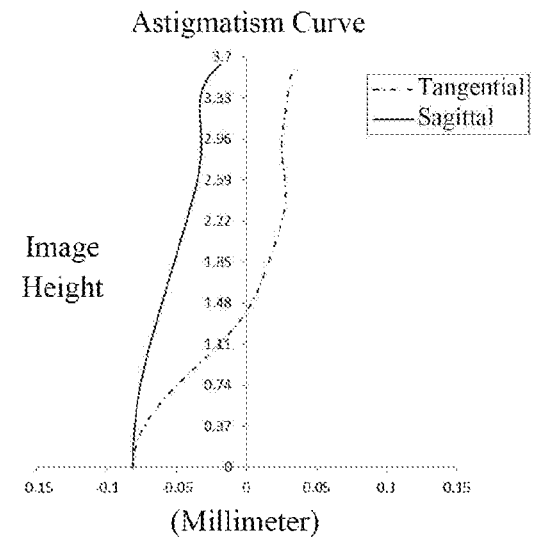
Figure 16C:
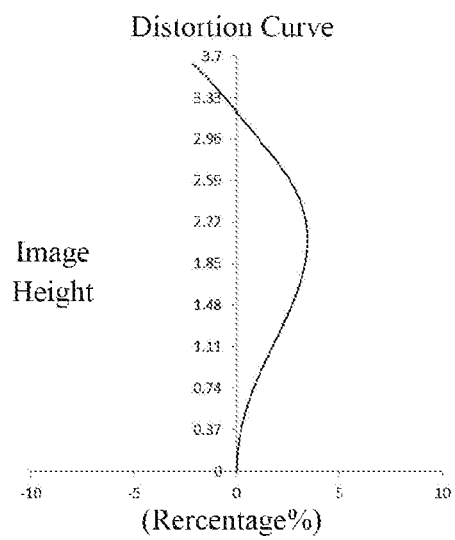
Figure 16D:
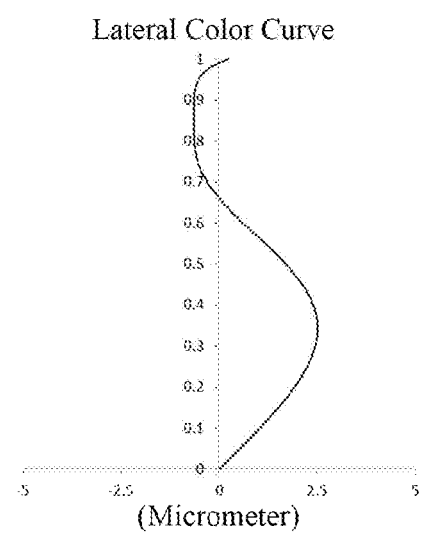

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatism curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion at different viewing angles. FIG. 16D illustrates a lateral color curve of the optical imaging lens assembly according to embodiment 8, representing deviations of different image heights on an image plane after light passes through the optical imaging lens assembly. It can be seen from FIG. 16A to FIG. 16D that the optical imaging lens assembly provided in embodiment 8 can achieve good image quality.

Based on the above, embodiments 1 to 8 respectively satisfy the relationship shown in Table 25.

TABLE 25

| Formula | Embodiment | | | | | | | |
| | 1 | 2 | 3 | 4 | 5 | 6 | 7 | 8 |
|---|---|---|---|---|---|---|---|---|
| T56/T23 | 5.20 | 5.87 | 8.06 | 5.85 | 6.90 | 8.36 | 4.72 | 3.53 |
| TTL/ImgH | 1.36 | 1.35 | 1.35 | 1.35 | 1.34 | 1.39 | 1.35 | 1.35 |
| f5/f6 | −1.45 | −1.43 | −1.67 | −1.75 | −1.93 | −2.26 | −4.31 | −3.16 |
| f1/R1 | 2.13 | 2.14 | 2.19 | 2.15 | 2.06 | 2.07 | 2.29 | 2.11 |
| (R3 + R4)/(R3 − R4) | 4.10 | 4.32 | 4.14 | 5.14 | 3.88 | 3.36 | 3.01 | 2.80 |
| CT1/CT6 | 2.25 | 2.12 | 1.96 | 2.16 | 2.24 | 3.55 | 1.15 | 2.53 |
| |f5/R10| | 2.91 | 3.03 | 3.81 | 3.75 | 4.07 | 4.78 | 8.40 | 6.36 |
| |f/f5| + |f/f6| | 2.14 | 2.16 | 1.88 | 1.97 | 1.93 | 1.68 | 1.28 | 1.59 |
| R11/R12 | −0.24 | −0.29 | −0.31 | −0.50 | −0.53 | −1.15 | −2.03 | −0.37 |
| TTL/ΣAT | 2.81 | 2.88 | 2.93 | 2.93 | 2.92 | 2.71 | 2.96 | 2.45 |

TABLE 25-continued

| Formula | Embodiment | | | | | | | |
|---|---|---|---|---|---|---|---|---|
| | 1 | 2 | 3 | 4 | 5 | 6 | 7 | 8 |
| \|f6/CT6\| | 11.32 | 11.08 | 10.76 | 11.32 | 11.53 | 18.60 | 8.58 | 14.27 |
| f/R12 | 0.45 | 0.52 | 0.52 | 0.77 | 0.81 | 1.15 | 1.28 | 0.61 |
| T56/(T12 + T23 + T34) | 2.71 | 2.36 | 1.94 | 1.71 | 1.81 | 2.00 | 2.76 | 2.38 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising, sequentially from an object side to an image side along an optical axis, a first lens, a second lens, a third lens, a fourth lens, a fifth lens and a sixth lens, wherein:
   the first lens has a positive refractive power, an object-side surface of the first lens is a convex surface and an image-side surface of the first lens is a concave surface;
   the second lens has a positive refractive power or a negative refractive power, an object-side surface of the second lens is a convex surface and an image-side surface of the second lens is a concave surface;
   the third lens has a positive refractive power or a negative refractive power;
   the fourth lens has a positive refractive power or a negative refractive power, and an object-side surface of the fourth lens is a concave surface;
   the fifth lens has a positive refractive power, an object-side surface of the fifth lens is a concave surface in a paraxial region and an image-side surface of the fifth lens is a convex surface in a paraxial region;
   the sixth lens has a negative refractive power, and an object-side surface of the sixth lens is a concave surface;
   a total effective focal length f of the optical imaging lens assembly and a radius of curvature R12 of an image-side surface of the sixth lens satisfy: 0≤f/R12≤1.5; and
   an effective focal length f5 of the fifth lens and an effective focal length f6 of the sixth lens satisfy: −5.0<f5/f6<−1.0.

2. The optical imaging lens assembly according to claim 1, wherein an effective focal length f1 of the first lens and a radius of curvature R1 of the object-side surface of the first lens satisfy: 2.0≤f1/R1<2.5.

3. The optical imaging lens assembly according to claim 1, wherein an effective focal length f5 of the fifth lens and a radius of curvature R10 of the image-side surface of the fifth lens satisfy: 2.0<\|f5/R10\|<9.0.

4. The optical imaging lens assembly according to claim 1, wherein a total effective focal length f of the optical imaging lens assembly, an effective focal length f5 of the fifth lens and an effective focal length f6 of the sixth length satisfy: 1.0<\|f/F5\|+\|f/f6\|<2.5.

5. The optical imaging lens assembly according to claim 1, wherein an effective focal length f6 of the sixth lens and a center thickness CT6 on the optical axis of the sixth lens satisfy: 8<\|f6/CT6\|<20.

6. The optical imaging lens assembly according to claim 1, wherein a radius of curvature R3 of the object-side surface of the second lens and a radius of curvature R4 of the image-side surface of the second lens satisfy: 2.5≤(R3+R4)/(R3−R4)<6.0.

7. The optical imaging lens assembly according to claim 1, wherein a radius of curvature R11 of the object-side surface of the sixth lens and a radius of curvature R12 of an image-side surface of the sixth lens satisfy:−3.0<R11/R12<0.

8. The optical imaging lens assembly according to claim 1, wherein a distance TTL on the optical axis from a center of the object-side surface of the first lens to an image plane of the optical imaging lens assembly and a sum of spaced distances ΣAT on the optical axis between any two adjacent lenses of the first lens to the sixth lens satisfy: 2.0<TTL/ΣAT≤3.0.

9. The optical imaging lens assembly according to claim 1, wherein the distance TTL on the optical axis from the center of the object-side surface of the first lens to the image plane of the optical imaging lens assembly and half of a diagonal length ImgH of an effective pixel area on the image plane of the optical imaging lens assembly satisfy: TTL/ImgH≤1.5.

10. The optical imaging lens assembly according to claim 1, wherein a center thickness CT1 on the optical axis of the first lens and a center thickness CT6 on the optical axis of the sixth lens satisfy: 1.0<CT1/CT6<4.0.

11. An optical imaging lens assembly comprising, sequentially from an object side to an image side along an optical axis, a first lens, a second lens, a third lens, a fourth lens, a fifth lens and a sixth lens, wherein:
   the first lens has a positive refractive power, an object-side surface of the first lens is a convex surface and an image-side surface of the first lens is a concave surface;
   the second lens has a positive refractive power or a negative refractive power, an object-side surface of the second lens is a convex surface, and an image-side surface of the second lens is a concave surface;
   the third lens has a positive refractive power or a negative refractive power;
   the fourth lens has a positive refractive power or a negative refractive power, and an object-side surface of the fourth lens is a concave surface;

the fifth lens has a positive refractive power, an object-side surface of the fifth lens is a concave surface in a paraxial region, and an image-side surface of the fifth lens is a convex surface in a paraxial region;

the sixth lens has a negative refractive power, and an object-side surface of the sixth lens is a concave surface; and a spaced distance T56 on the optical axis between the fifth lens and the sixth lens, a spaced distance T12 on the optical axis between the first lens and the second lens, a spaced distance T23 on the optical axis between the second lens and the third lens, and a spaced distance T34 on the optical axis between the third lens and the fourth lens satisfy: 1.5≤T56/(T12+T23+T34)≤3.0.

12. The optical imaging lens assembly according to claim 11, wherein a total effective focal length f of the optical imaging lens assembly, an effective focal length f5 of the fifth lens and an effective focal length f6 of the sixth lens satisfy: 1.0<|f/f5|+|f/f6|<2.5.

13. The optical imaging lens assembly according to claim 12, wherein the effective focal length f5 of the fifth lens and the effective focal length f6 of the sixth lens satisfy: −5.0<f5/f6<−1.0.

14. An optical imaging lens assembly comprising, sequentially from an object side to an image side along an optical axis, a first lens, a second lens, a third lens, a fourth lens, a fifth lens and a sixth lens, wherein:

the first lens has a positive refractive power, an object-side surface of the first lens is a convex surface and an image-side surface of the first lens is a concave surface;

the second lens has a positive refractive power or a negative refractive power, an object-side surface of the second lens is a convex surface, and an image-side surface of the second lens is a concave surface;

the third lens has a positive refractive power or a negative refractive power;

the fourth lens has a positive refractive power or a negative refractive power, and an object-side surface of the fourth lens is a concave surface;

the fifth lens has a positive refractive power, an object-side surface of the fifth lens is a concave surface in a paraxial region, and an image-side surface of the fifth lens is a convex surface in a paraxial region;

the sixth lens has a negative refractive power, and an object-side surface of the sixth lens is a concave surface; and a spaced distance T56 on the optical axis between the fifth lens and the sixth lens and a paced distance T23 on the optical axis between the second lens and the third lens satisfy: 4.5<T56/T23<10.0.

15. The optical imaging lens assembly according to claim 14, wherein an effective focal length f1 of the first lens and a radius of curvature R1 of the object-side surface of the first lens satisfy: 2.0≤f1/R1<2.5.

16. The optical imaging lens assembly according to claim 14, wherein an effective focal length f5 of the fifth lens and a radius of curvature R10 of the image-side surface of the fifth lens satisfy: 2.0<|f5/R10|<9.0.

17. The optical imaging lens assembly according to claim 14, wherein a total effective focal length f of the optical imaging lens assembly, an effective focal length f5 of the fifth lens and an effective focal length f6 of the sixth lens satisfy: 1.0<|f/f5|+|f/f6|<2.5.

18. The optical imaging lens assembly according to claim 14, wherein a distance TTL on the optical axis from a center of the object-side surface of the first lens to an image plane of the optical imaging lens assembly and half of a diagonal length ImgH of an effective pixel area on the image plane of the optical imaging lens assembly satisfy: TTL/ImgH≤1.5.

19. The optical imaging lens assembly according to claim 14, wherein a distance TTL on the optical axis from a center of the object-side surface of the first lens to an image plane of the optical imaging lens assembly and a sum of spaced distances ΣAT on the optical axis between any two adjacent lenses of the first lens to the sixth lens satisfy: 2.0<TTL/ΣAT≤3.0.

* * * * *